United States Patent
Marumoto et al.

(10) Patent No.: US 8,018,621 B2
(45) Date of Patent: Sep. 13, 2011

(54) DATA GENERATION AND PRINTING WITH BINARIZATION PATTERN SELECTED AS FUNCTION OF PIXEL NUMBER CORRESPONDING TO CONVEYING AMOUNT OF PRINT MEDIUM

(75) Inventors: Yoshitomo Marumoto, Yokohama (JP); Hiromitsu Yamaguchi, Yokohama (JP); Hitoshi Tsuboi, Kawasaki (JP); Ryoki Jahana, Kawasaki (JP); Ayako Uji, Kawasaki (JP); Eri Noguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 12/184,683

(22) Filed: Aug. 1, 2008

(65) Prior Publication Data
US 2009/0040550 A1 Feb. 12, 2009

(30) Foreign Application Priority Data
Aug. 8, 2007 (JP) ................................. 2007-207157

(51) Int. Cl.
H04N 1/405 (2006.01)
H04N 1/034 (2006.01)
B41J 2/205 (2006.01)

(52) U.S. Cl. ...... 358/1.9; 358/3.06; 358/3.14; 358/3.21; 347/15

(58) Field of Classification Search .................... 358/1.9, 358/1.8, 3.01, 3.06, 3.13, 3.14, 3.21, 1.13, 358/502; 347/5, 12, 14, 15, 104
See application file for complete search history.

(56) References Cited

U.S. PATENT DOCUMENTS

| | | | |
|---|---|---|---|
| 4,920,355 A * | 4/1990 | Katerberg | 347/41 |
| 5,831,642 A | 11/1998 | Matsubara et al. | |
| 7,130,083 B1 | 10/2006 | Konno et al. | |
| 7,281,780 B2 * | 10/2007 | Nagamura et al. | 347/19 |
| 7,360,856 B2 | 4/2008 | Ochiai et al. | |
| 7,506,950 B2 * | 3/2009 | Noguchi et al. | 347/15 |
| 7,614,713 B2 * | 11/2009 | Marumoto | 347/14 |
| 7,837,283 B2 * | 11/2010 | Goto et al. | 347/5 |
| 2005/0219279 A1 | 10/2005 | Goto et al. | |
| 2007/0097164 A1 | 5/2007 | Marumoto | |
| 2007/0236526 A1 | 10/2007 | Noguchi et al. | |
| 2008/0136854 A1 | 6/2008 | Yamaguchi et al. | |
| 2008/0137146 A1 | 6/2008 | Marumoto | |
| 2009/0219317 A1 * | 9/2009 | Masuyama | 347/12 |

FOREIGN PATENT DOCUMENTS

| | | |
|---|---|---|
| JP | 5-31922 | 2/1993 |
| JP | 2001-54956 | 2/2001 |
| JP | 2007-306551 | 11/2007 |

* cited by examiner

*Primary Examiner* — Scott A Rogers
(74) *Attorney, Agent, or Firm* — Fitzpatrick, Cella, Harper & Scinto

(57) ABSTRACT

When a feeding amount for multi-pass printing is changed, the purpose related to an image quality using a binary data generation pattern can still be attained by, for example, a density pattern method. Specifically, a multi-pass printing mode is identified, and a density pattern selection matrix associated with a cycle of binary data generation is selected in accordance with the selected printing mode. That is, a density pattern selection matrix employed for binary data generation using a density pattern is changed to a size corresponding to the feeding amount designated by the selected printing mode. Thereby, a phenomenon that a unit used for image processing to gain a predetermined purpose related to an image quality does not match a unit area used for a printing operation is avoided, and an image printing purpose using a binary data generation pattern can be appropriately attained.

10 Claims, 22 Drawing Sheets

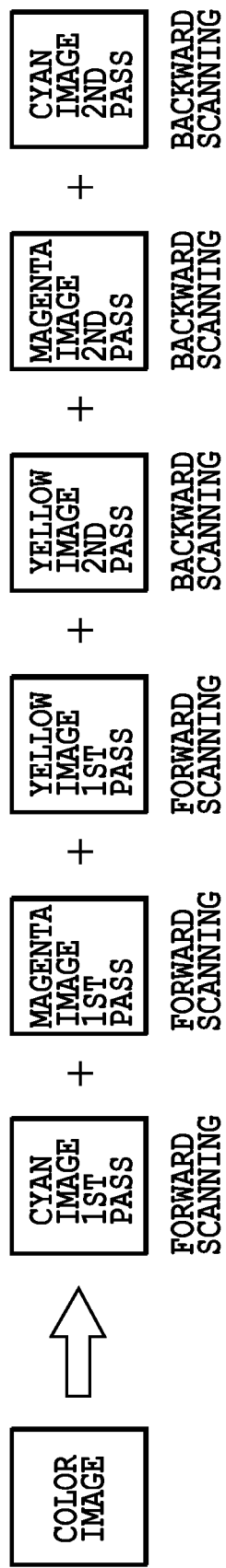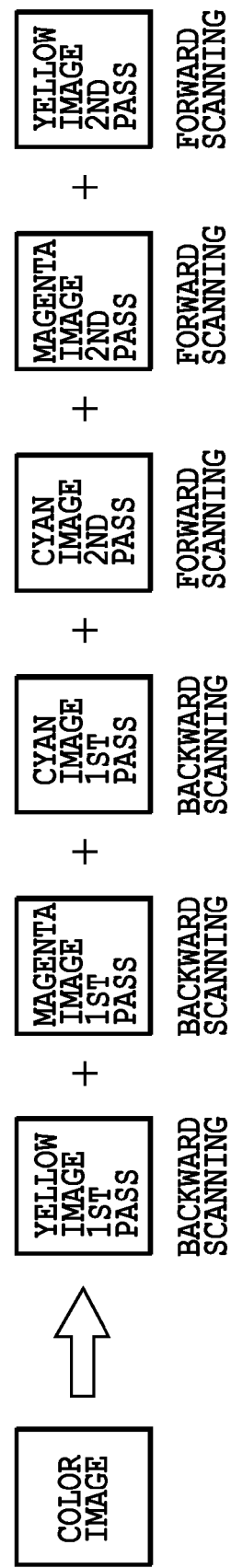
FIG.3A
FIG.3B

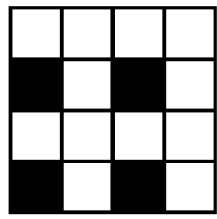
FIG.12A BINARY DATA PATTERN
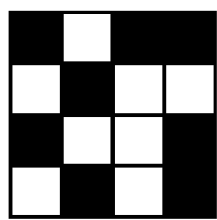
FIG.12B MASK PATTERN
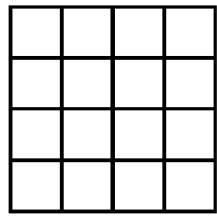
FIG.12C FIRST PASS
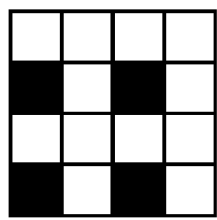
FIG.12D SECOND PASS

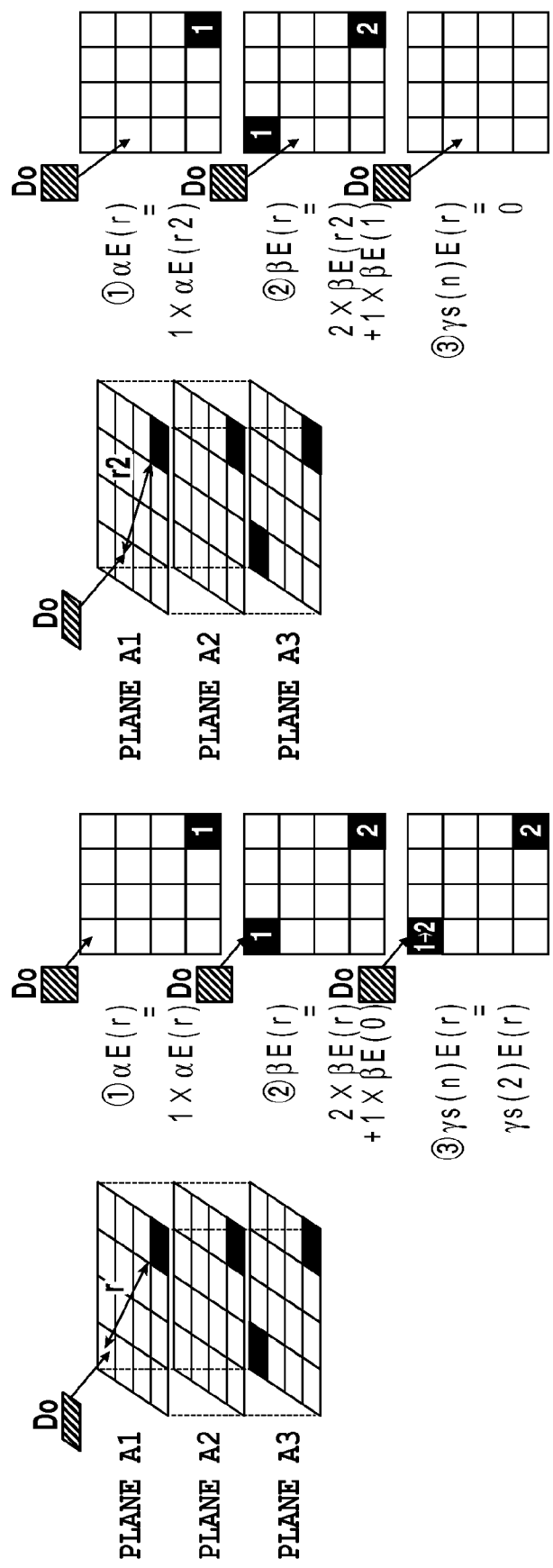

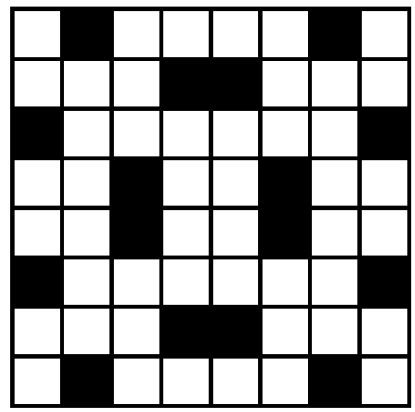
LEVEL 1
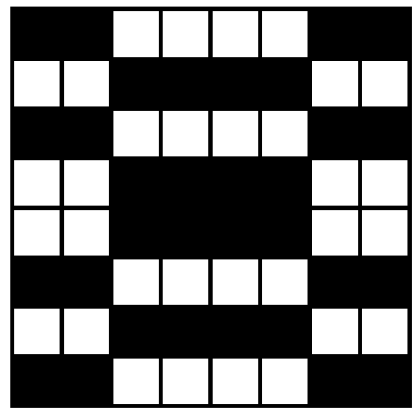
LEVEL 2
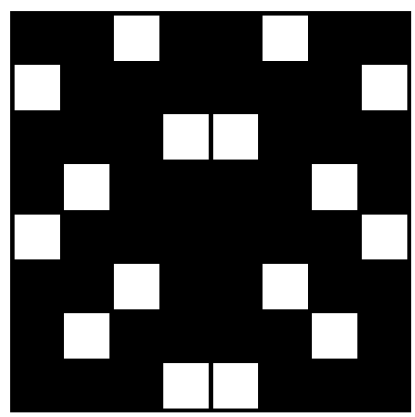
LEVEL 3
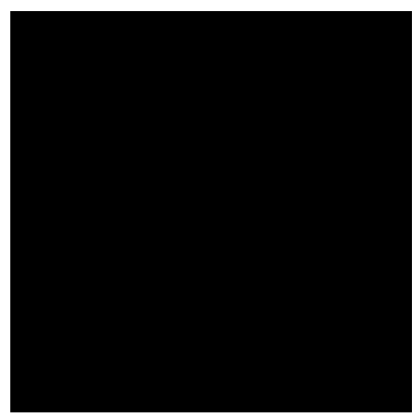
LEVEL 4
FIG.17

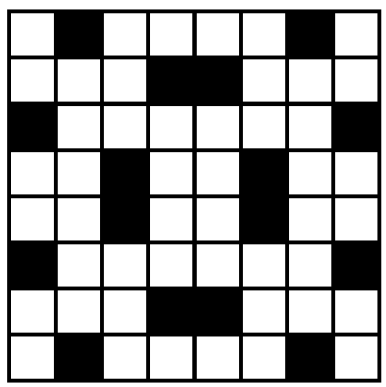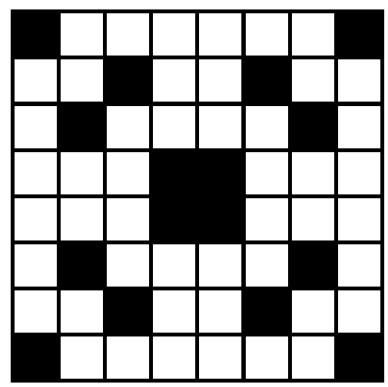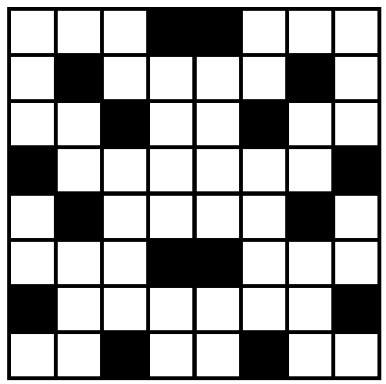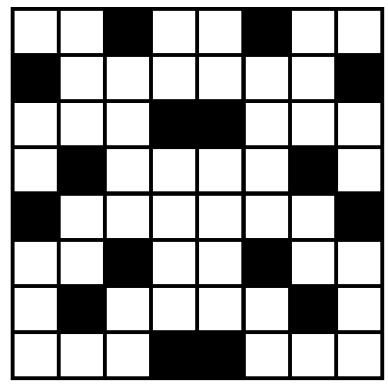
FIG.18

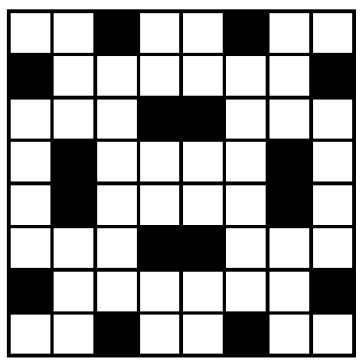
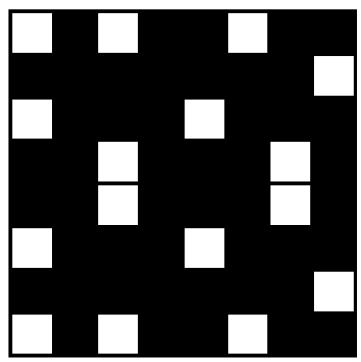
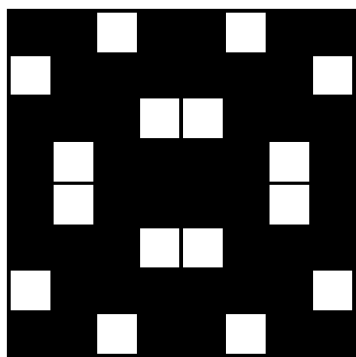
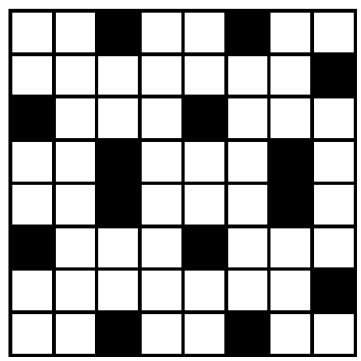
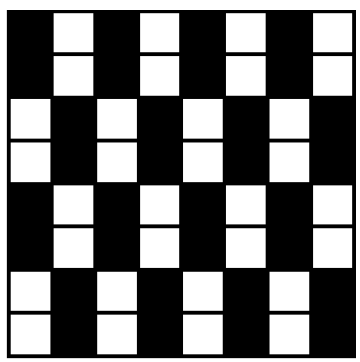
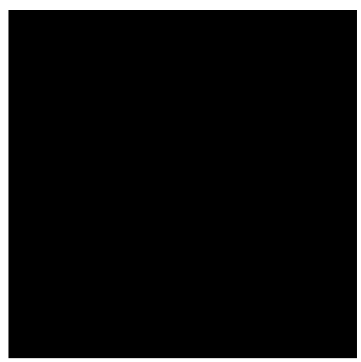
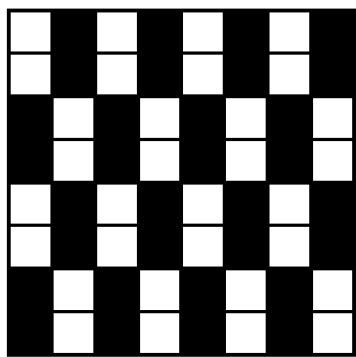
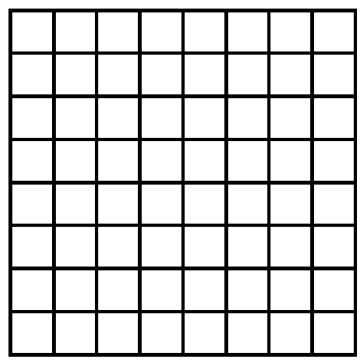
FIG. 20

DATA GENERATION AND PRINTING WITH BINARIZATION PATTERN SELECTED AS FUNCTION OF PIXEL NUMBER CORRESPONDING TO CONVEYING AMOUNT OF PRINT MEDIUM

BACKGROUND OF THE INVENTION

1. Field of the Invention

The present invention relates to a data generation apparatus, a printing apparatus and a data generation method. Particularly, the present invention relates to processing for generating print data which is used for completing printing of a unit area of a printing medium by performing a plurality of times of scans (movements) of a print head and by performing conveying of the printing medium between respective the scans (movements).

2. Description of the Related Arts

With the spread of information processing apparatuses such as personal computers, printing apparatuses that serve as image forming terminals have also spread. Inkjet printing apparatuses especially, for performing printing on a print medium such as paper, by ejecting ink onto the medium, through ejection ports, have the included advantages of being non-impact, reduced noise printing types, for which fast printing at high densities are enabled, and of being easily compatible with color printing. Because of these advantages, inkjet printing apparatuses are rapidly becoming the favored, personal use printing apparatuses.

A so-called serial type inkjet printing apparatus frequently employs a multi-pass printing method. It should be noted that "pass" and "scan" used below have the same definition. According to the multi-pass printing method, image data for a predetermined area (unit area) is divided into data for each color and each pass, and a mask is generally employed for this data division.

FIG. 1 is a diagram for explaining a multi-pass printing that employs a mask, and illustrates a print head and printed dot patterns schematically for a case four scans are performed to complete printing of an image in a unit area. In FIG. 1, a reference sign P0001 denotes a print head. To simplify the drawing and the explanation, the print head P0001 is shown to include a nozzle array of 16 ejection ports (hereinafter also referred to as nozzles). The nozzle array is divided into the first to the fourth nozzle groups, each of which includes four nozzles. A reference sign P0002 denotes a mask pattern. In the mask patterns P0002, mask pixels (print permitting pixels) that permit printing correspondingly to the individual nozzles are indicated by solid black. The mask patterns corresponding to the four nozzle groups are complementary to one another, and by superposing the four patterns, all of the 4×4 pixels become print permitting pixels. That is, the four patterns are employed to complete printing of the 4×4 area.

Reference signs P0003 to P0006 denote arrangement patterns of formed dots, which illustrate how an image is completed by repeating printing scans. As shown in these patterns, multi-pass printing forms dots based on binary print data (dot data), which are generated by mask patterns correspondingly to the nozzle groups, in each of printing scans. Then each time a printing scan is completed, the printing medium is conveyed a distance, equivalent to the width of a nozzle group, in the direction indicated by an arrow in FIG. 1. By scanning four times in this manner, an image is formed in the area of the printing medium corresponding to the width of each nozzle group.

According to the above described multi-pass printing method, uneven print densities, which results from a variation in the ink ejection directions and ink ejection amount among multiple nozzles which are due to manufacturing processes of the print head and from an error in paper conveying operation performed between the printing scans, can be made less noticeable.

The example in FIG. 1 is for four-pass printing. The same process is performed for two-pass printing, in which two scans are employed to complete the printing of an image, three-pass printing, in which three scans are employed to complete the printing of an image, or multi-pass printing, in which five or more passes are provided for five or more scans employed to complete the printing of an image. That is, the numbers of ejection port groups provided by dividing ejection ports on a print head and the amount a printing medium is conveyed, which are basically explained while referring to FIG. 1, are determined in accordance with the number of passes for completing printing.

Binary data (dot data) used for multi-pass printing is generated by employing a pseudo gradation method, such as a density pattern method or a dither method. When the density pattern method is employed, several types of density patterns having fixed dot arrangements are provided correspondingly to respective density levels. Then, a density pattern corresponding to an input density level is selected in accordance with a density pattern selection matrix and thereby binary data is generated. When the dither method is employed, binary data is generated using a dither pattern wherein threshold values are arranged in a predetermined pattern.

The density pattern selection matrix and the dither pattern are not prepared as a pattern or matrix of the same size to that of binary data that are expanded, but the density pattern selection matrix and the dither pattern having a predetermined size are repetitively used in accordance with the overall size of the binary data to be expanded.

Conventionally, each of the repetitively used density pattern selection matrix and dither patterns is a single pattern size of which is fixed. According to Japanese Patent Laid-Open No. 2001-54956, a single pattern having a fixed size is employed as a density pattern selection matrix (an index pattern) to perform multi-pass printing. As described in this conventional example, when, for example, the number of passes for multi-pass printing is to be changed according to switching printing modes, the conventional system that performs the multi-pass printing employs a binarization pattern having a fixed size.

However, when a conventional binarization pattern (the density pattern selection matrix, the dither pattern) having a fixed size is universally employed for a multi-pass printing system in which the number of passes is variable, following problems have arisen. More specifically, since a pattern of fixed size may not be appropriate relative to the amount of distance which a printing medium is conveyed between respective scans (hereinafter this amount is also called a feeding amount), an image printing objective designed by the pattern, such as the printing quality, may not be achieved.

This problem is described below specifically. Binary data that is generated based on the density pattern selection matrix or the dither pattern is generated in the cycle of repetition according to the size of a density pattern selection matrix or a dither pattern.

In this case, when the feeding amount is integer multiple of the cycle of repetition of binary data generation (the binarization pattern), the same repetition cycle for binary data is applied for all unit areas. Therefore, the deterioration of image quality does not occur due to a difference in the dot arrangements applied for the unit areas and a difference in the order of dot formation applied for the unit areas. However, when the feeding amount is not an integer multiple of the repetition cycle for binary data (the binarization pattern), the repetition cycle for the binary data appears in a different way among the unit areas. Further, the same repetition cycle for the binary data generation corresponds to two adjacent unit areas, and therefore the binarization pattern that is determined by taking into consideration the image quality objective, especially the size of the binarization pattern, operates over different unit areas. As a result, the dot arrangement and the dot forming order in a unit area may be made different among the unit areas, and deterioration of the image quality may occur that is due to differences in the dot arrangements and in the dot forming order.

SUMMARY OF THE INVENTION

An object of the present invention is to provide a data generation apparatus, a printing apparatus and a data generation method wherein, when a feeding amount for multi-pass printing is changed, the repetitive cycle for binary data generation (the binarization pattern) can appear in the same way for respective unit areas.

In a first aspect of the present invention, there is provided a data generating apparatus for generating binary data used for performing printing on a printing medium by using a printing head in which a plurality of nozzles are arranged, the apparatus comprising: a setting part for setting a printing mode, in which a plurality of movements of the printing head are performed and the printing medium is conveyed by a conveying amount smaller than an arranging width of the plurality of nozzles of the printing head between each of the plurality of movements, to perform printing on an area corresponding to the conveying amount; a selection part for selecting a binarization pattern having a number of pixels corresponding to a divisor of a number of pixels that corresponds to the conveying amount in the printing mode set by the setting part, from a plurality of binarization patterns that differ in a number of pixels in a conveying direction of the printing medium from each other; and a generation part for generating binary data corresponding to the area by using a binarization pattern selected by the selection part.

In a second aspect of the present invention, there is provided a data generating apparatus for generating binary data used for performing printing on a printing medium by using a printing head in which a plurality of nozzles are arranged, the apparatus comprising: a setting part for setting one printing mode in a plurality of printing modes including a first printing mode, in which M (M is an integer 2 or greater) times of movements of the printing head are performed and the printing medium is conveyed by a first conveying amount smaller than an arranging width of the plurality of nozzles of the printing head between each of the M times of movements, to perform printing on an area having a width corresponding to the first conveying amount and a second printing mode, in which N (N is an integer greater than M) times of movements of the printing head is performed and the printing medium is conveyed by a second conveying amount, which is smaller than the first conveying amount, between each of the N times of movements, to perform printing on an area having a width corresponding to the second conveying amount; and a generation part for, when the first printing mode is set, generating binary data corresponding to the area having the width corresponding to the first conveying amount by using a first binarization pattern having a number of pixels in a conveying direction of the printing medium, the number of pixels corresponding to a divisor of a number of pixels that corresponds to the first conveying amount, and when the second printing mode is set, generating binary data corresponding to the area having the width corresponding to the second conveying amount by using a second binarization pattern that differs from the first binarization pattern and has a number of pixels in the conveying direction, the number of pixels corresponding to a divisor of a number of pixels that corresponds to the second conveying amount.

In a third aspect of the present invention, there is provided a printing apparatus for performing printing on a printing medium by using a print head in which a plurality of nozzles are arranged, the apparatus comprising: a setting part for setting one printing mode in a plurality of printing modes including a first printing mode, in which M (M is an integer 2 or greater) times of movements of the printing head are performed and the printing medium is conveyed by a first conveying amount smaller than an arranging width of the plurality of nozzles of the printing head between each of the M times of movements, to perform printing on an area having a width corresponding to the first conveying amount and a second printing mode, in which N (N is an integer greater than M) times of movements of the printing head are performed and the printing medium is conveyed by a second conveying amount, which is smaller than the first conveying amount, between each of the N times of movements, to perform printing on an area having a width corresponding to the second conveying amount; and a generation part for, when the first printing mode is set, generating binary data corresponding to the area having the width corresponding to the first conveying amount by using a first binarization pattern having a number of pixels in a conveying direction of the printing medium, the number of pixels corresponding to a divisor of a number of pixels that corresponds to the first conveying amount, and when the second printing mode is set, generating binary data corresponding to the area having the width corresponding to the second conveying amount by using a second binarization pattern that differs from the first binarization pattern and has a number of pixels in the conveying direction, the number of pixels corresponding to a divisor of a number of pixels that corresponds to the second conveying amount.

In a fourth aspect of the present invention, there is provided a data generating method of generating binary data used for performing printing on a printing medium by using a print head in which a plurality of nozzles are arranged, the method comprising: a setting step of setting a printing mode, in which a plurality of movements of the printing head are performed and the printing medium is conveyed by a conveying amount smaller than an arranging width of the plurality of nozzles of the printing head between each of the plurality of movements, to perform printing on an area corresponding to the conveying amount; a selection step of selecting a binarization pattern having a number of pixels corresponding to a divisor of a number of pixels that corresponds to the conveying amount in the printing mode set by the setting step, from a plurality of binarization patterns that differ in a number of pixels in a conveying direction of the printing medium from each other; and a generation step of generating binary data corresponding to the area by using a binarization pattern selected by the selection part.

According to the above configuration, even if a feeding amount for multi-pass printing is changed, the repetition cycle for binary data generation (the binarization pattern) can be applied in the same way for each unit area. Thereby, a dot arrangement and dot forming order for a unit area can be identically applied for respective unit areas, and deterioration of the image quality will not occur due to differences in the dot arrangements and in the dot forming orders.

Further features of the present invention will become apparent from the following description of exemplary embodiments with reference to the attached drawings.

BRIEF DESCRIPTION OF THE DRAWINGS

FIGS. 3A and 3B are diagrams for explaining a case, according to a first embodiment of the present invention, wherein two-pass printing is to be performed using C, M and Y ink;

FIGS. 12A to 12D are diagrams for explaining the interference produced by a mask pattern employed for the quantization of print data;

FIGS. 13A to 13D are schematic diagrams illustrating the processing for the calculation of a repulsive force potential and the attenuation of the total, available energy;

FIG. 17 is a diagram showing dot arrangement patterns based on index data;

FIG. 18 is a diagram showing patterns, based on the dot arrangement patterns shown in FIG. 17, that should be taken into account for the fabrication of a mask;

FIG. 20 is a diagram showing patterns, based on the dot arrangement patterns shown in FIG. 19, that should be taken into account for fabrication of a mask.

DESCRIPTION OF THE EMBODIMENTS

The preferred embodiments of the present invention will now be described in detail while referring to the accompanying drawings.

A printer used as an inkjet printing apparatus according to a first embodiment of the present invention selectively perform a plurality of printing modes, for which a different number of passes and different conveying amounts are used in multi-pass printing. As will be described later while referring to FIG. 11, the repetition cycle for generation of binary data (repetition cycle of binarization pattern) is changed in accordance with the feeding amount of a printing medium that corresponds to a selected printing mode.

Figure 1:
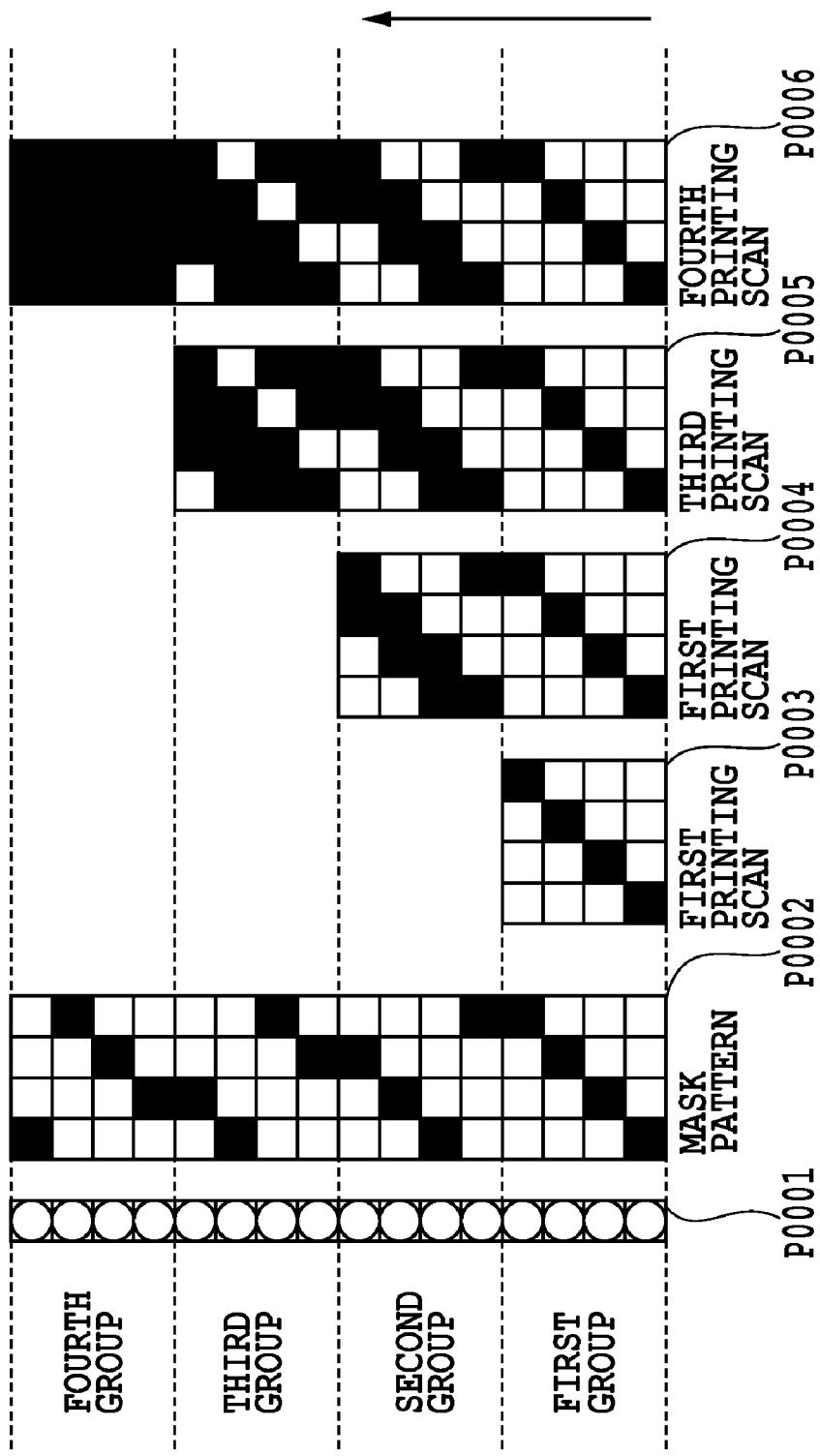
FIG. 1 is a schematic diagram illustrating a multi-pass printing method that employs a print head and printed dot patterns.
Figure 2:
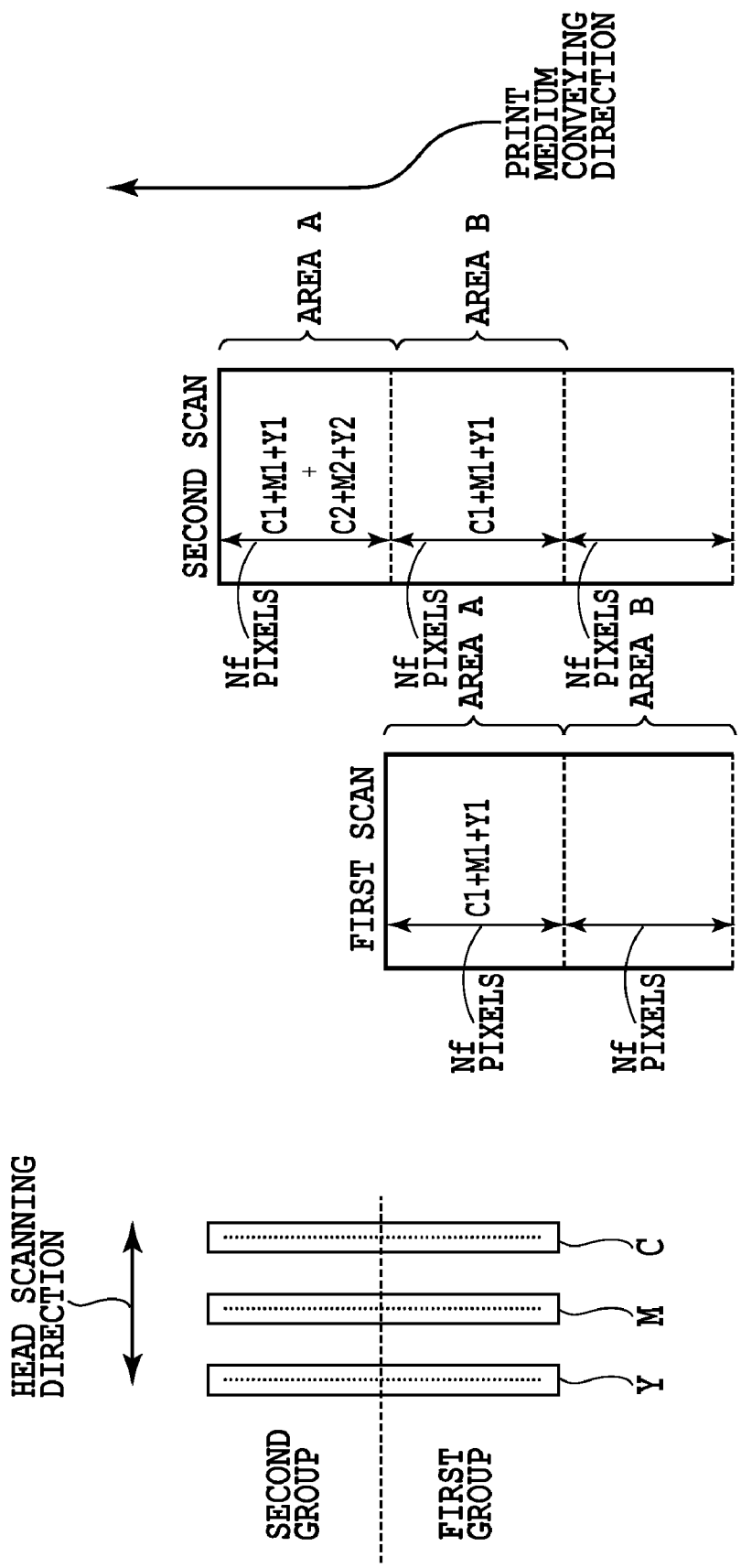
FIG. 2 is a diagram showing a relationship between a print head and a printing medium when two-pass printing is to be performed.

FIG. 2 is a schematic diagram showing a relationship between a print head and a printing medium in a two-pass printing mode of printing modes to be performed by a printer according to this embodiment. In the two-pass printing mode, a print head scans a printing medium twice to complete printing of an image in the unit area on the printing medium.

Respective color nozzle arrays for cyan, magenta and yellow are divided into a first group and a second group that include 256 nozzles each. Therefore, the number of nozzles for one color is 512. When the print head scans the printing medium in directions ("head scanning directions" indicated by a double-headed arrow in FIG. 2) substantially perpendicular to the nozzle array direction, ink is ejected from the color nozzle arrays to the individual unit areas of the printing medium each of which corresponds to the array widths of each nozzle group. In this example, based on C, M and Y binary image data, C, M and Y ink is ejected to the individual unit areas. Further, when scanning is ended, the printing medium is conveyed by an amount equivalent to the width of one group (in this case, the length of 256 pixels equivalent to the width of the unit area) in a direction (here, a "printing medium conveying direction" indicated by an arrow in FIG. 2) perpendicular to (across) the head scanning direction. Thus, an image has been printed in each unit area by two scans. Hereinafter, the conveying amount which the printing medium is conveyed between a plurality of scans to complete printing of an image is also called a feeding amount. As shown in FIG. 2, the feeding amount (conveying amount) is represented as an amount equivalent to a length of Nf (=256) pixels.

The two-pass printing mode will now be more specifically described. At the first scan, an area A of the printing medium is printed by employing the respective first groups of the C nozzle array, the M nozzle array and the Y nozzle array in the named order. Then, at the second scan, the remaining data is printed on the area A that has been printed by the first scan, by using the respective second groups of the Y, M and C nozzle arrays in the named order. Further, a nonprinted area B is printed by employing the respective first groups of the Y, M and C nozzle arrays in this order. This processing is repeated to perform printing to the respective unit areas (the area A and the area B) in the order of C1, M1, Y1, Y2, M2 and C2, or the order of Y1, M1, C1, C2, M2 and Y2.

FIGS. 3A and 3B are diagrams for explaining the order of printing a unit area for a case wherein, as shown in FIG. 2, two-pass printing is to be performed using C, M and Y ink.

In FIG. 3A is shown the process for printing an image in an area (the area A in FIG. 2) in the order of forward scanning and backward scanning. At the forward scanning (first pass) that is the first scanning, first of all, a cyan image is printed based on cyan dot data that is generated for each pass using a mask, as will be described later while referring to FIG. 5. Sequentially, magenta and yellow images are printed by the same scan, based on dot data that is also generated using the mask in the same manner. That is, the magenta image is superposed with the previously printed cyan image, and the yellow image is printed by being superposed with the cyan and magenta images. The printing medium is conveyed a predetermined amount, and then, the same processing is performed at the backward scanning (second pass) that is the second scan. That is, based on yellow, magenta and cyan dot data generated for each pass using a mask, images are printed by being superimposed with the images that were previously printed.

In FIG. 3B is shown the process until completion of printing of an image in an area (the area B in FIG. 2) for which printing is performed in the order of backward scan and forward scan. At the backward scan (first pass) that is the first scanning, a yellow image is printed based on yellow dot data that is generated based on a mask for each pass. Following this, at the same scanning, magenta and cyan images are printed based on dot data that is generated using the mask for the pass in the same manner. That is, the magenta image is printed by being superposed with the yellow image that was previously printed, and the cyan image is printed on the yellow and magenta images that were previously printed. Then, in the forward scan (second pass) that is the second scanning after the printing medium is conveyed a predetermined amount, similarly, cyan, magenta and yellow dot data generated in the above described manner are employed, and images are sequentially printed on the images that were previously printed.

Figure 4:
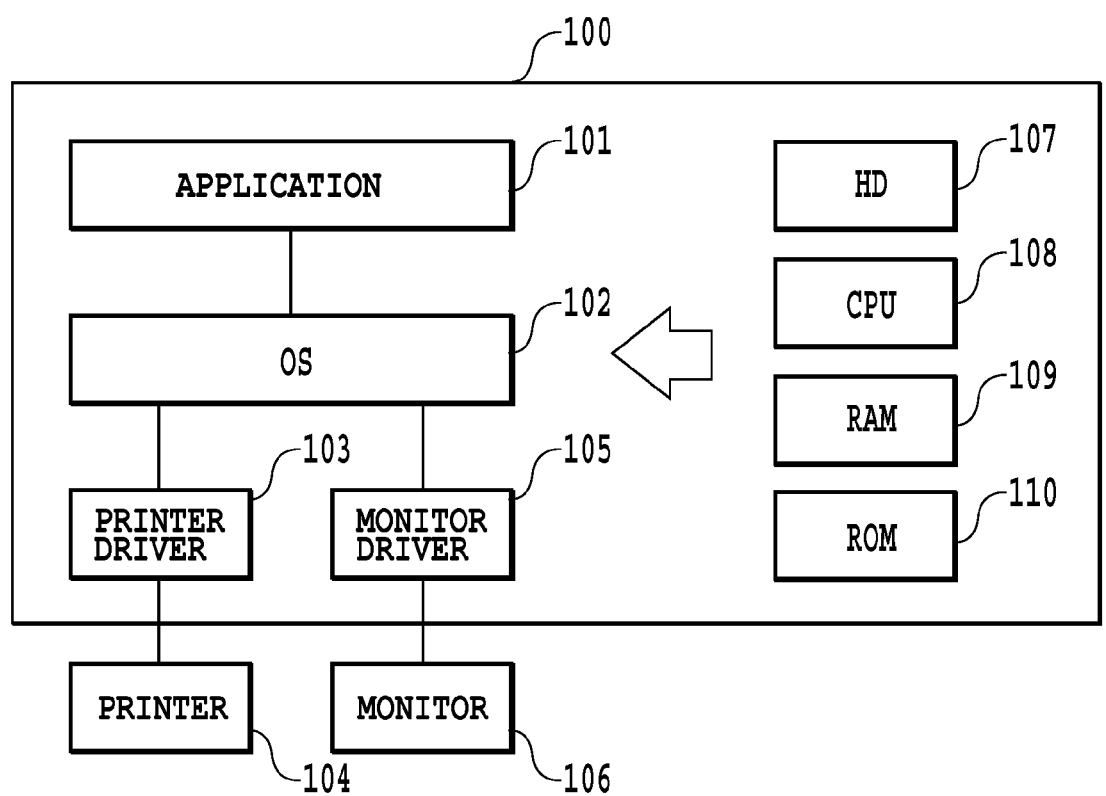
FIG. 4 is a block diagram that mainly illustrates the hardware and software configurations of a personal computer that serves as an image processing apparatus according to the first embodiment.

FIG. 4 is a block diagram mainly illustrating the hardware and software configuration of a personal computer (hereinafter simply referred to also as a PC) that is an image processing apparatus (data generation apparatus) according to this embodiment. In this embodiment, a computer 100, to which a printer driver 103 is installed to perform the binary data generation processing shown in FIG. 11 that will be described later, is defined as an image processing apparatus (data generation apparatus). However, the image processing apparatus (data generation apparatus) of this invention is not limited to this configuration. For example, when a printer 104 performs the binary data generation processing that is the feature of the invention, the printer 104 serves as an image processing apparatus (data generation apparatus).

In FIG. 4, the PC 100 that is a host computer employs an operating system (OS) 102 to operate individual software products, such as application software 101, the printer driver 103 and a monitor driver 105. The application software 101 performs processes related to word processing, a spreadsheet program and an internet browser. The monitor driver 104 performs a process, such as creation of image data to be displayed on a monitor 106.

The printer driver 103 processes image data and the like that are issued from the application software 101 to the OS 102, and generates binary ejection (dot) data that is finally employed by the printer 104. Specifically, the printer driver 103 performs the processing that will be described later while referring to FIG. 5 and FIG. 11, so as to based on C, M and Y multi-level image data, generate C, M and Y binary image data used by the printer 104. The thus obtained binary image data are transferred (supplied) to the printer 104.

The host computer 100 includes a CPU 108, a hard disk drive (HD) 107, a RAM 109 and a ROM 110, which are hardware components to operate the above described software products. That is, the CPU 108 performs the processing in accordance with the software program stored on the hard disk 107 or in the ROM 110, and employs the RAM 109 as a work area when performing the processing.

As described while referring to FIG. 2, the printer 104 in this embodiment is a so-called serial printer that moves a print head relative to a printing medium for scanning, and ejects ink from the printhead during scanning to perform printing. A print head that includes ejection port groups for C, M and Y ink colors is mounted to a carriage, and scans a printing medium, such as a sheet of paper. Printing elements, such as electrothermal converting elements or piezoelectric elements, are provided in ink flow paths that communicate with the individual ejection ports respectively in the print head, and by driving these printing elements, ink is ejected from the ejection ports. The arrangement density of the ejection ports is 1200 dpi, and ink of 3.0 picoliter is ejected from each ejection port. Further, 512 ejection ports are provided for each color nozzle array.

The printer 104 includes a CPU and a memory (neither of then shown), and binary image data received from the host computer 100 is received in the memory of the printer 104. The CPU reads binary image data from the memory and transfers the drive circuit of the print head, and based on the binary image data, the drive circuit drives the print elements of the print head to eject ink from the ejection ports.

Figure 5:
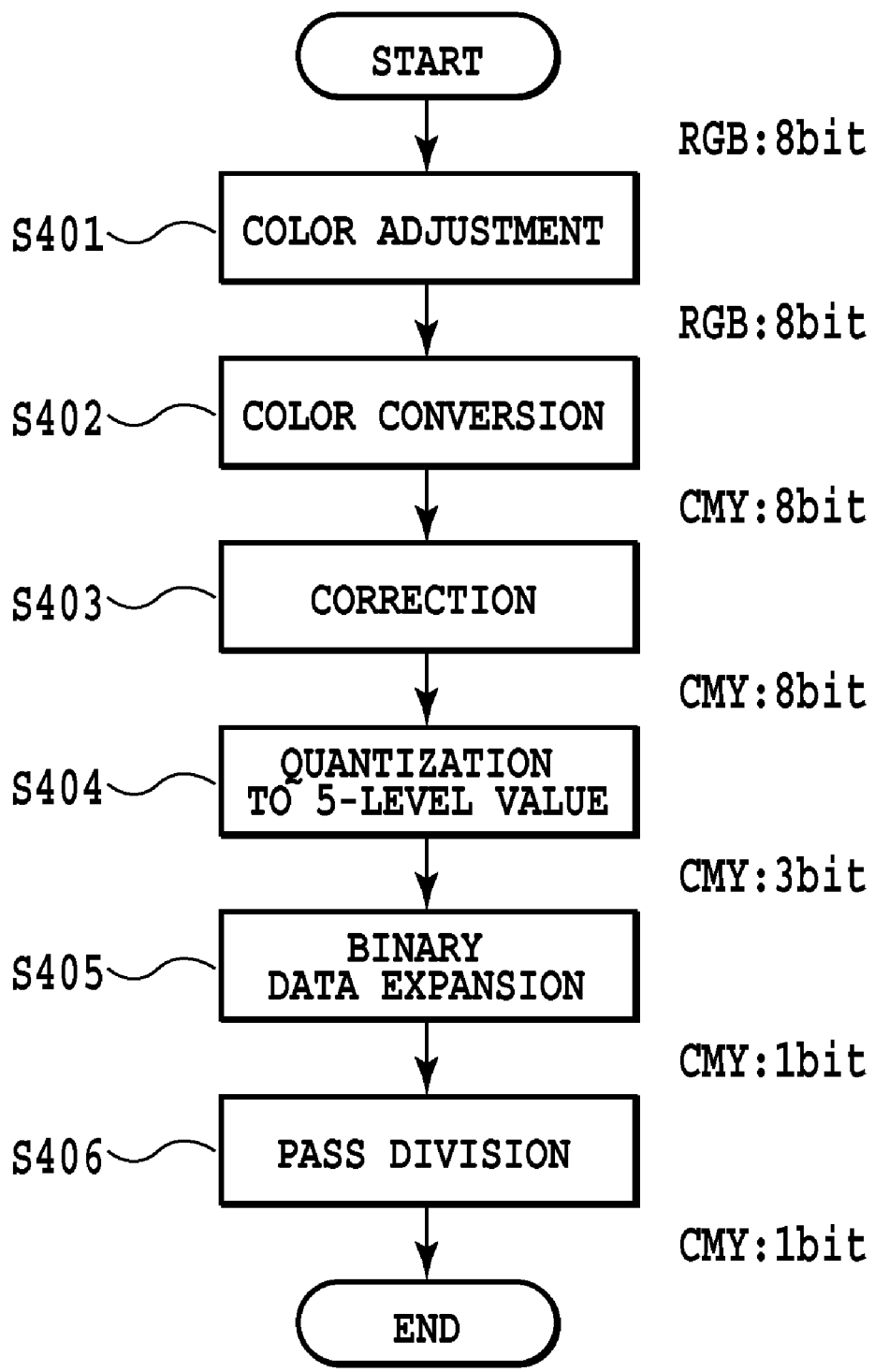
FIG. 5 is a flowchart showing the image processing performed for the first embodiment.

In the embodiment of the present invention, the density pattern method is employed to generate binary data for six planes that are distinguished by forward and backward scans and C, M and Y ink colors in the multi-pass printing mode. FIG. 5 is a flowchart showing the binary data generation processing.

In FIG. 5, first, a color adjustment process is performed for RGB 8 bit data (S401), and CMY image data of 8 bit are obtained by performing a color conversion process (S402). Then, a gamma correction process (S403) is performed for the image data.

Following this, the CMY 8 bit image data of 256 levels obtained through the above processes, are quantized by error diffusion, and 5-valued (levels) data of 3-bits obtained (S404). Then, based on 5-level data, binary data expansion is performed using a density pattern (dot arrangement pattern) shown in FIG. 6 (S405). It should be noted that the 5-level data obtained at step S404 has a resolution of 600 dpi for one pixel, while the density pattern (dot arrangement pattern) employs 2×2 pixels as one unit. Therefore, the resolution of the generated binary data is 1200 dpi×1200 dpi.

Figure 6:
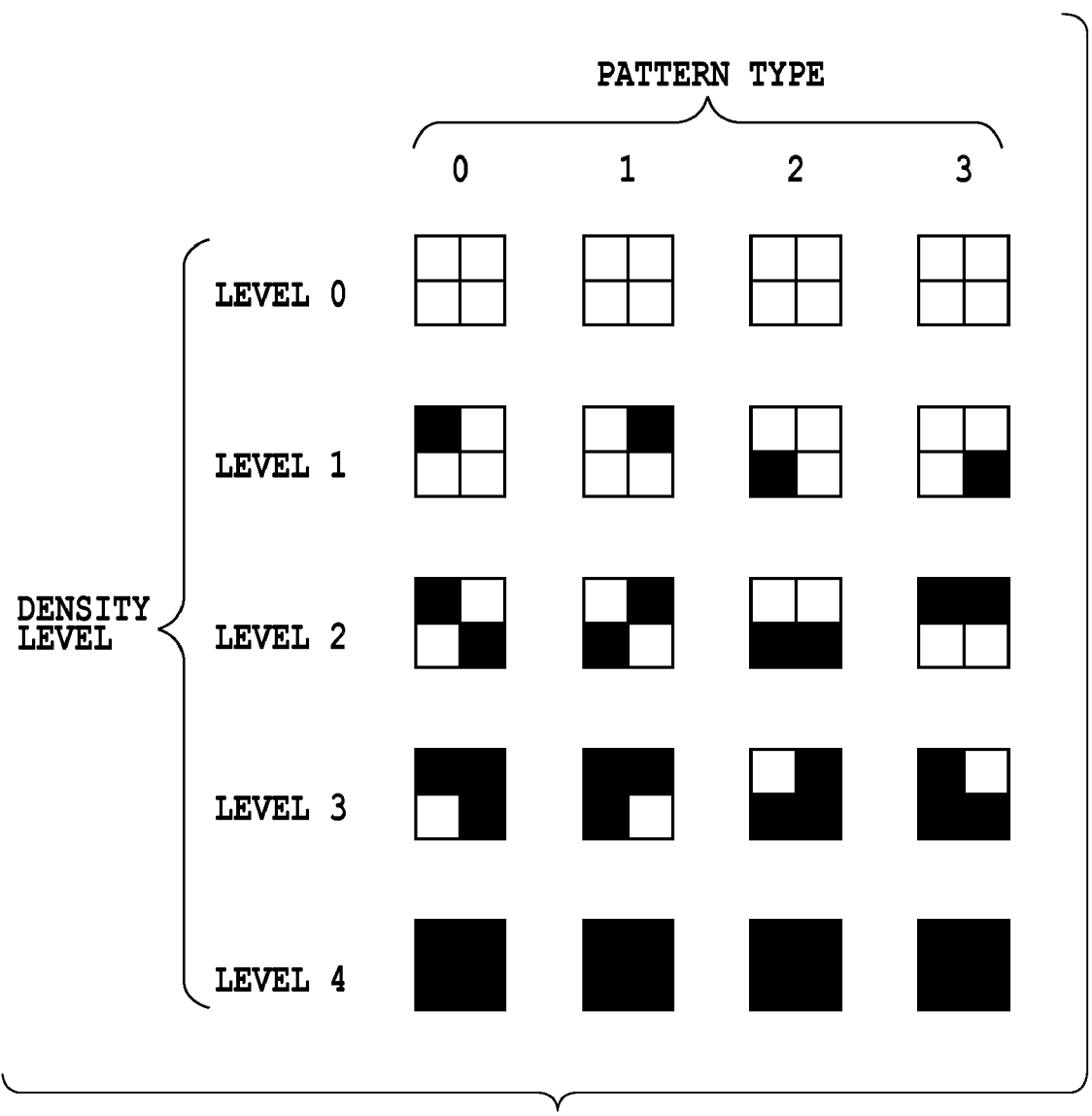
FIG. 6 is a diagram showing a density pattern employed for the first embodiment.

FIG. 6 is a diagram showing density patterns according to this embodiment. As shown in FIG. 6, four density pattern types are provided for each density level of 5-level data. In the binary data expansion process, depending on the density level indicated by the 5-level data, a density pattern is selected in accordance with the pattern type indicated by a density pattern selection matrix, and is employed as a 2×2 pixel unit of binary data. For example, when the density level indicated by 5-level data is "1" and the value of a density pattern selection matrix is "0", a 0-th density pattern is selected from among four types of density pattern level 1 (in 2×2 pixels, one dot is ON). By repeating this process, a binary image is generated at the resolution of 1200 dpi×1200 dpi.

Figure 21:
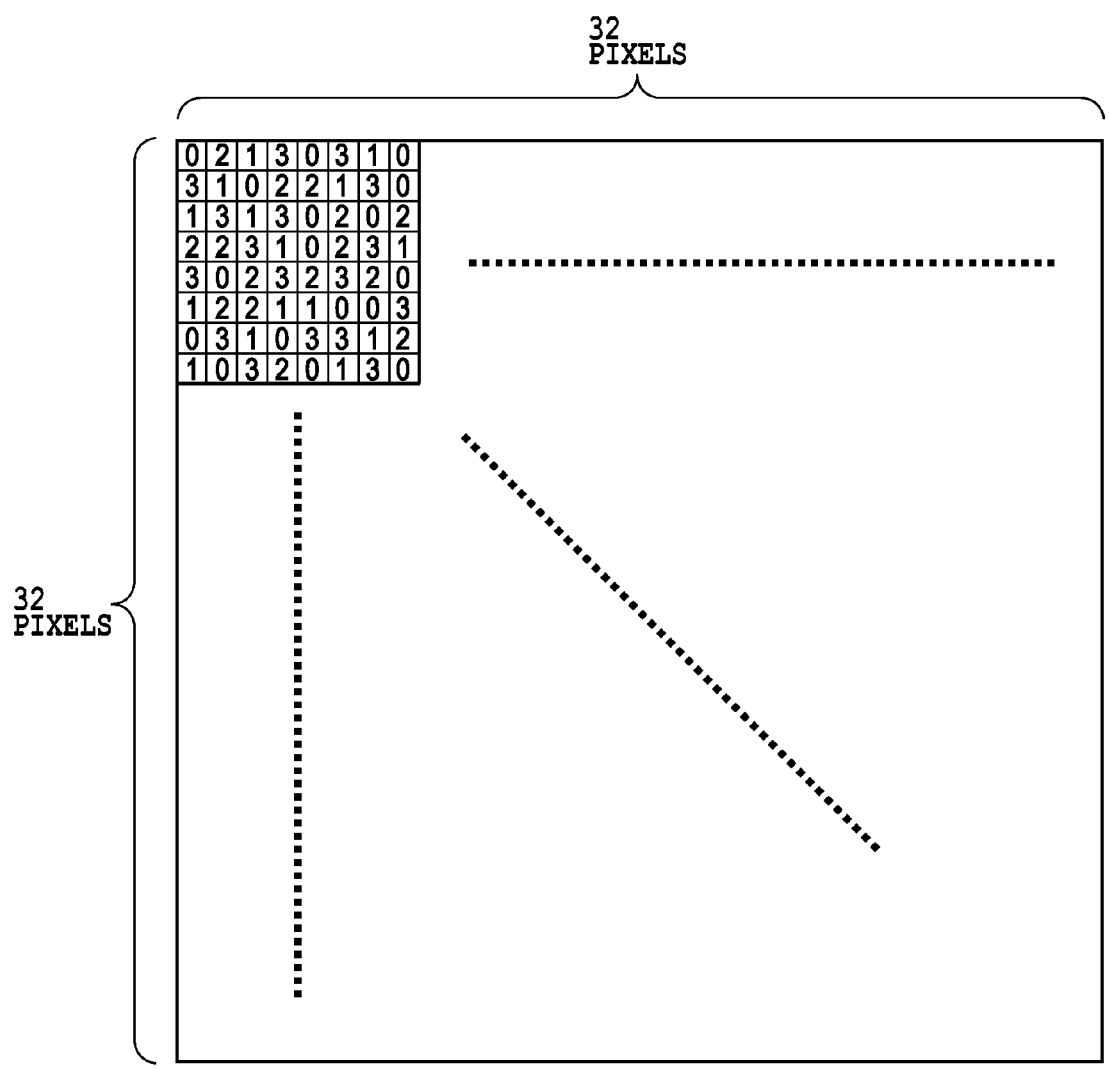
FIG. 21 is a diagram showing an example density selection matrix.

In this embodiment, the density pattern selection matrix pattern shown in FIG. 21 is employed as a binarization pattern. The density pattern selection matrix of this embodiment has a size of 32×32 pixels, and four values from 0 to 3 are irregularly entered in the individual pixels. Based on the pixel values of "0" to "3", the density pattern of 2×2 pixels is expanded, for the individual pixels of the density pattern selection matrix. That is, in accordance with the 32×32 pixel size of the density pattern selection matrix, the binary data (dot) pattern of 1200×1200 dpi is changed to a pattern of 64 pixels (main scanning direction)×64 (feeding direction) pixels cycles. Assuming that the size of a density pattern selection matrix is 100×100 pixels, binary data pattern is expanded into a pattern of 200×200 pixels cycles. In the size or cycle changing process for embodiments of the invention that will be described later, the size of a pattern that has been expanded using the density pattern selection matrix is focused on. However, the same process can also be applied for the size or the cycle for the density pattern selection matrix per se.

Referring again to FIG. 5, finally, based on binary data obtained through the binary data expansion, binary data respectively for the six planes are obtained using masks (S406).

Furthermore, it is apparent from the description below that the present invention can also be applied for a case wherein ink of four colors including black (Bk) is employed in addition to C, M and Y, or wherein ink including light ink having a low concentration or ink of special colors, such as red, blue and green, are employed.

First Embodiment

According to a first embodiment of the present invention, one printing mode that is selected from a plurality of printing modes between which the number of passes for multi-pass printing is different is set, and a feeding amount corresponding to the selected printing mode is determined. Then, to use a density pattern selection matrix of a size corresponding to the determined feeding amount, one matrix having the above size is selected from a plurality of density pattern selection matrixes.

As described while referring to FIG. 2, in the two-pass printing mode in this embodiment, the feeding amount Nf is equivalent to the length of 256 pixels because of the number of nozzles (512) provided for the print head. According to this feeding amount, in the two-pass printing mode, the size of the density pattern selection matrix in the feeding direction is defined as the length of 32 pixels, and a repetition cycle Ng of binary data in the feeding direction to be expanded using a density pattern matrix is defined as the length of 64 pixels. That is, the feeding amount Nf is the integer multiple of the repetition cycle Ng, i.e., the repetition cycle Ng (=64 pixels) is defined as a divisor of the feeding amount Nf (=256 pixels).

Figure 7:
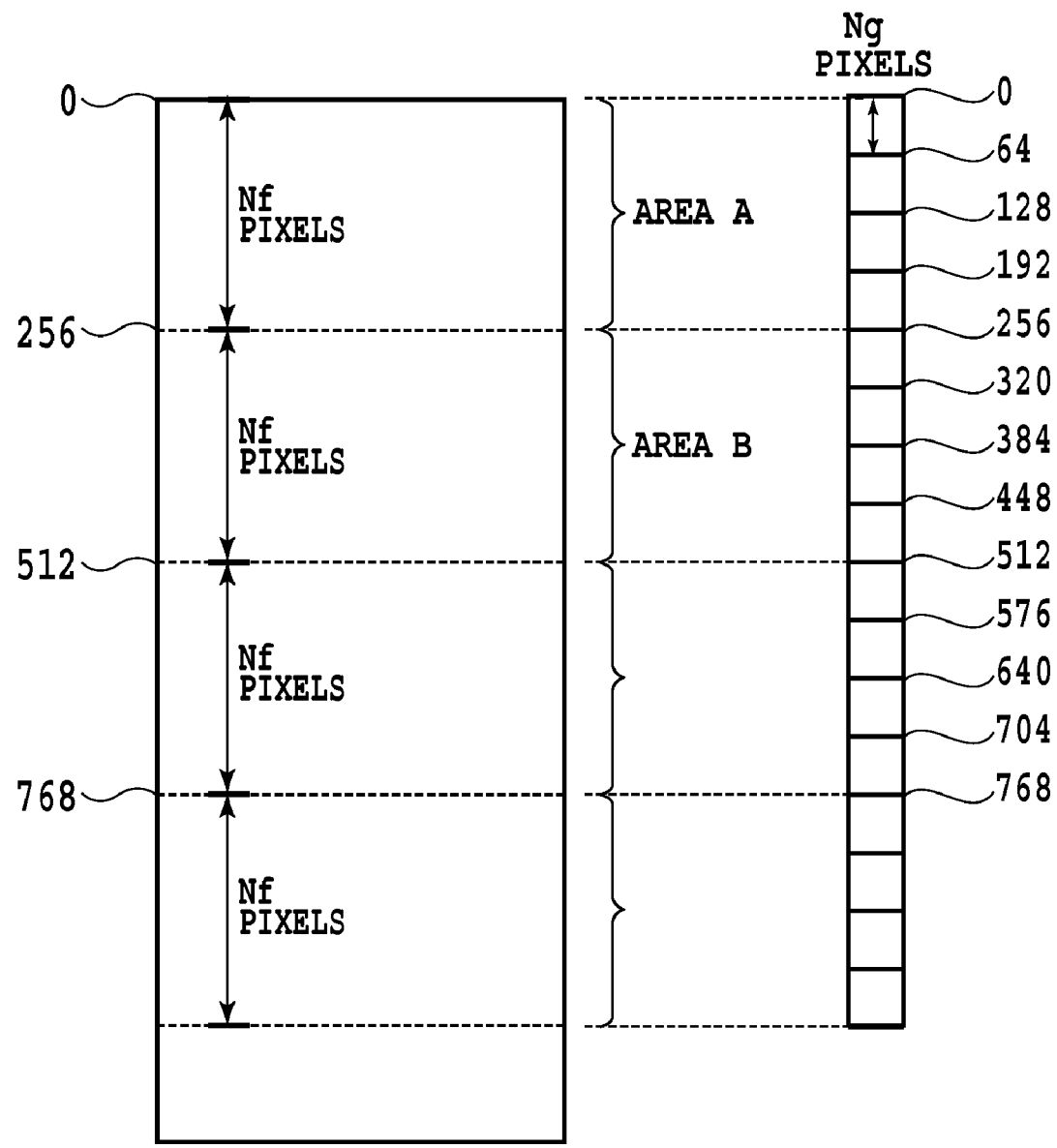
FIG. 7 is a diagram for explaining a relationship, for the first embodiment, between a repetitive generation cycle for binary data and a feeding amount.

FIG. 7 is a diagram for explaining a relationship between the repetition cycle and the feeding amount. As shown in FIG. 7, the upper ends of areas A, B, - - - , each of which is a unit area for which printing is completed by a plurality of scans, always match the same position (pixel) in the repetition cycle.

Next, a description will now be given for a case where the number of passes for multi-pass printing is changed to three passes by changing of the printing mode or the like.

Figure 8:
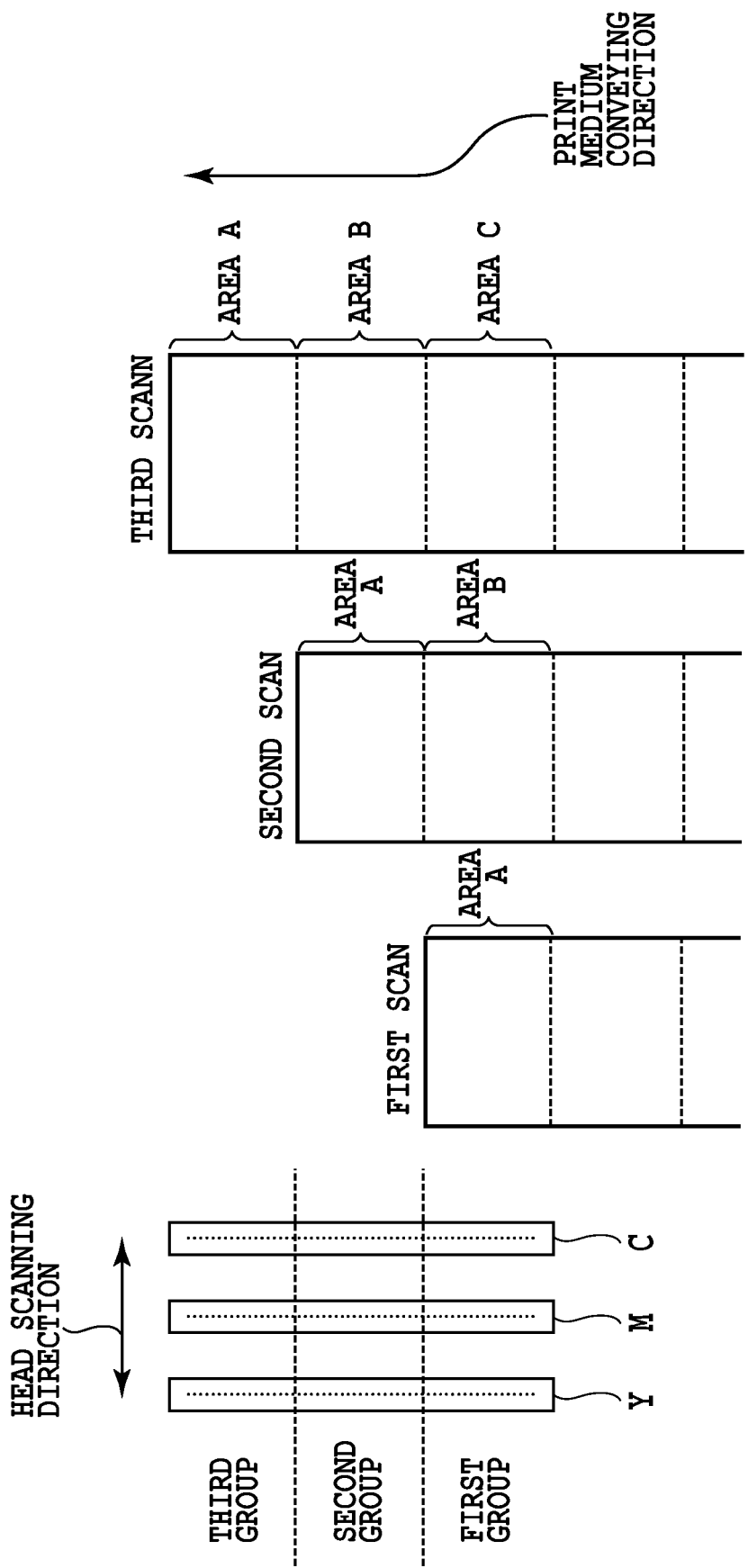
FIG. 8 is a schematic diagram showing a relationship between a print head and a printing medium for three-pass printing.

FIG. 8 is a diagram for explaining three-pass printing, and schematically showing a relationship between a print head and a printing medium. As will be described below, in the three-pass printing mode, a printing head scans a printing medium three times to complete printing of an image in a predetermined unit area of the printing medium.

Cyan, magenta and yellow nozzle arrays are respectively divided into first, second and third groups, each of which includes 168 nozzles. In this embodiment, a value of 168 is selected because this is close to 170, which is obtained by dividing 512 nozzles (corresponding to pixels in this case) by three.

The printhead scans the printing medium in a direction ("head scanning direction" indicated by a double-headed arrow in FIG. 8) perpendicular to a nozzle arrangement direction, and ejects ink from the nozzle arrays to the unit areas each of which corresponds to the widths of the nozzle arrays of each of the nozzle groups. In this example, based on C, M and Y binary image data, C, M and Y ink is ejected to the individual unit areas. Further, when scanning is ended, the printing medium is conveyed in a direction ("printing medium conveying direction" indicated by an arrow in FIG. 8) perpendicular to (across) the scanning direction of the print head, an amount equivalent to the width of one nozzle group, i.e., the feeding amount=the length of 168 pixels. Then, the same operation is repeated once more, and printing for the individual unit areas is completed by three scans.

Figure 9:
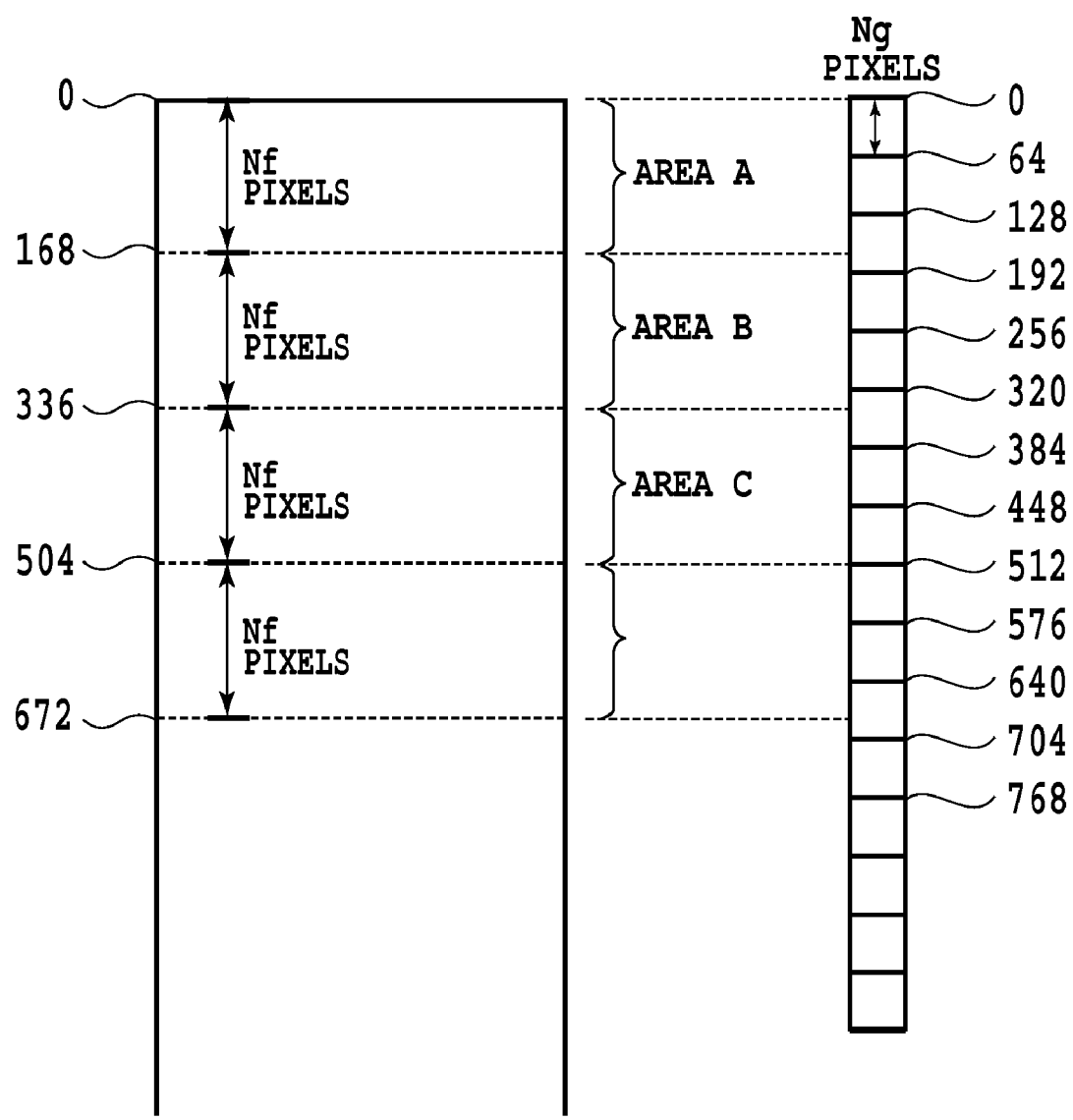
FIG. 9 is a diagram for explaining a relationship between a feeding amount and a repetitive generation cycle for a case wherein a repetitive generation cycle for binary data is not a divisor of the feeding amount.

At this time, assume that the repetition cycle Ng (=64) of binary data generation is not a divisor of the feeding amount Nf (=168 pixels), i.e., assume that the repetition cycle is not to be changed. FIG. 9 is a diagram for explaining a relationship between a feeding amount Nf and a repetition cycle Ng in this case.

Assume that a beginning position of the area A is defined as 0, and matches the beginning position of the repetition cycle. At this time, the beginning position of the area B represents coordinate 168 in the feeding direction that is equivalent to the feeding amount (for 168 pixels). When the repetition cycle Ng is equivalent to the length of 64 pixels, the beginning coordinates 168 of the area B is not divisible by 64, unlike in the two-pass printing case. That is, binary data at different positions (pixels) in the repetition cycle are as a whole related to the area A and the area B respectively. Further, after the printing medium is conveyed the length of 168 pixels, the beginning coordinate 340 is obtained for the area C. This indicates that the binary data generation cycle is shifted, and likewise, binary data at different locations (pixels) in the repetition cycle are wholly related to two areas. When the feeding amount Nf is not the integer multiple of the repetition cycle Ng in this manner, the repetition cycle of binary data generation (binarization pattern) appears in different way between the unit areas. Then, the arrangement of dots and the order of forming dots for a unit area become different between the unit areas. As a result, a deterioration of an image might occur due to the difference in the arrangement of dots and the order of forming dots.

According to this embodiment, when the number of passes for multi-pass printing is changed, the feeding amount that is changed in response to the change of the number of passes is employed to change the repetition cycle Ng of binary data generation. In this embodiment, for three-pass printing, the repetition cycle Ng should be 84 that is a divisor of the feeding amount Nf (=168 pixels). Specifically, for three-pass printing shown in this example, a matrix of 42 pixels (the main scanning direction; the head scanning direction)×42 pixels (the feeding direction; the printing medium conveying direction) for three-pass printing, which is different from a two-pass printing matrix, is employed as a density pattern selection matrix. Further, the density pattern is defined as the size of 2 pixels×2 pixels. Therefore, when the density pattern expanding process is performed, binary data of 84 pixels is generated both in the scanning direction and in the feeding direction.

It is preferable that, as will be described later, a value greater than the smallest value of 32 is selected as a divisor. That is, it is effective that a density pattern method should be designed to prepare a plurality of density patterns in accordance with density levels, so that a cycle for selecting these density patterns will not become regular. With pattern irregularity, overlapping of dots when the dot printing position is deviated can be prevented from being changed. In order to perform irregular selection of the density pattern, the cycle or the size of the density pattern selection matrix should be increased to a degree. According to the study of the present inventors, at least a density pattern selection matrix of 32 pixels is preferable. In this embodiment, the density pattern selection matrixes corresponding to the feeding amounts are prepared in advance. However, the present invention is not limited to this aspect. For example, only one density pattern selection matrix (e.g., 100 pixels×100 pixels) larger than a size employed for each feeding amount may be prepared, and may be cut into a pattern size corresponding to the feeding amount. As an advantage of this aspect, a plurality of density pattern selection matrixes of different sizes need not be prepared in advance.

Figure 10:
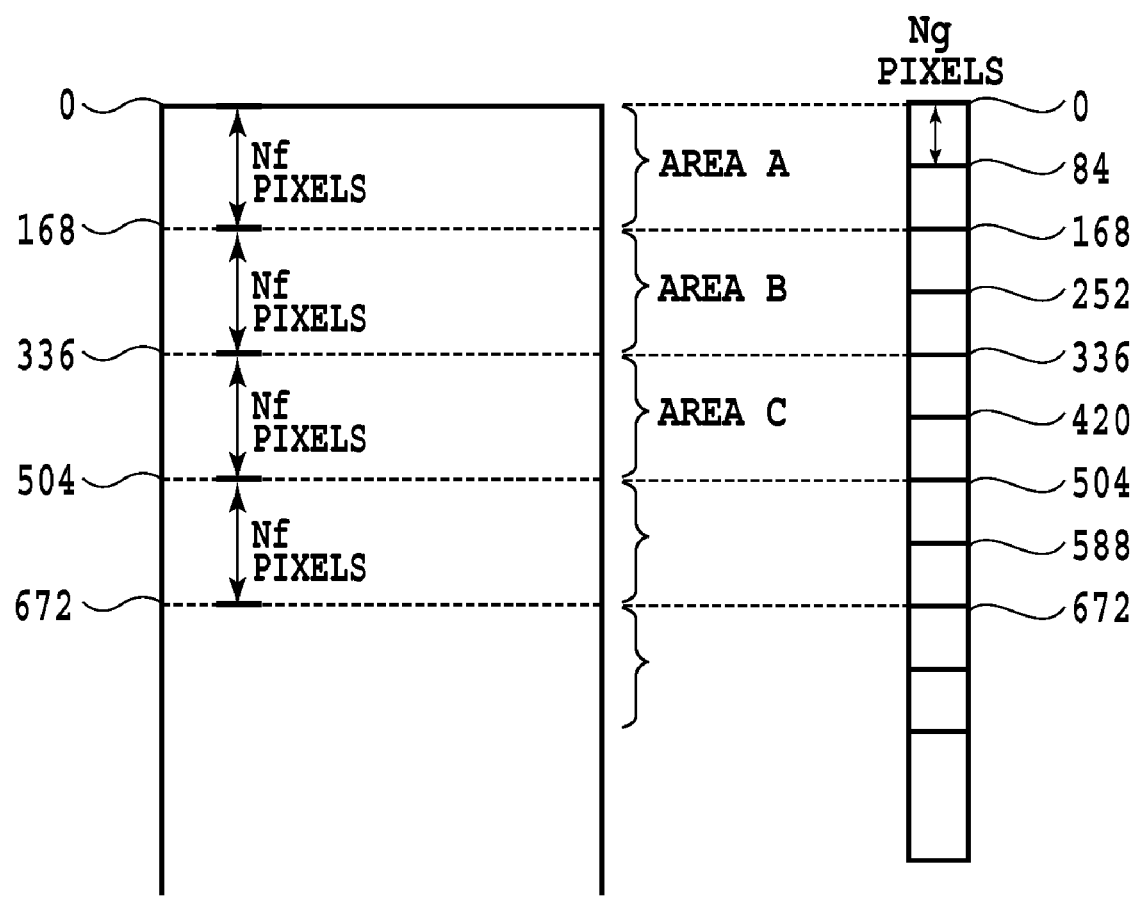
FIG. 10 is a diagram showing a relationship between a feeding amount and a repetition cycle for three-pass printing according to the first embodiment.

FIG. 10 is a diagram showing a relationship between the feeding amount Nf and the repetition cycle Ng for the three-pass printing of this embodiment. As shown in FIG. 10, when the feeding amount is changed to an amount equivalent to a length of 168 pixels, the repetition cycle is also changed to a repetition cycle equivalent to a length of 84 pixels.

According to the above configuration, an image printing purpose, such as the improvement of an image quality, to be achieved using a density pattern, can be appropriately attained. More specifically, the density pattern selection matrix is prepared in which the dot arrangement and the pattern size are determined by the matrix size, so that a predetermined purpose related to an image quality can be attained. The unit area for which printing is completed by multi-pass printing is a unit for which various conditions of the printing operation, such as the order of using the nozzles of the print head, are designated. A unit used for image processing to attain a predetermined purpose related to the image quality is made match a unit used for the printing operation, and thereby an image printing purpose using a binary data generation pattern can be appropriately attained.

Figure 11:
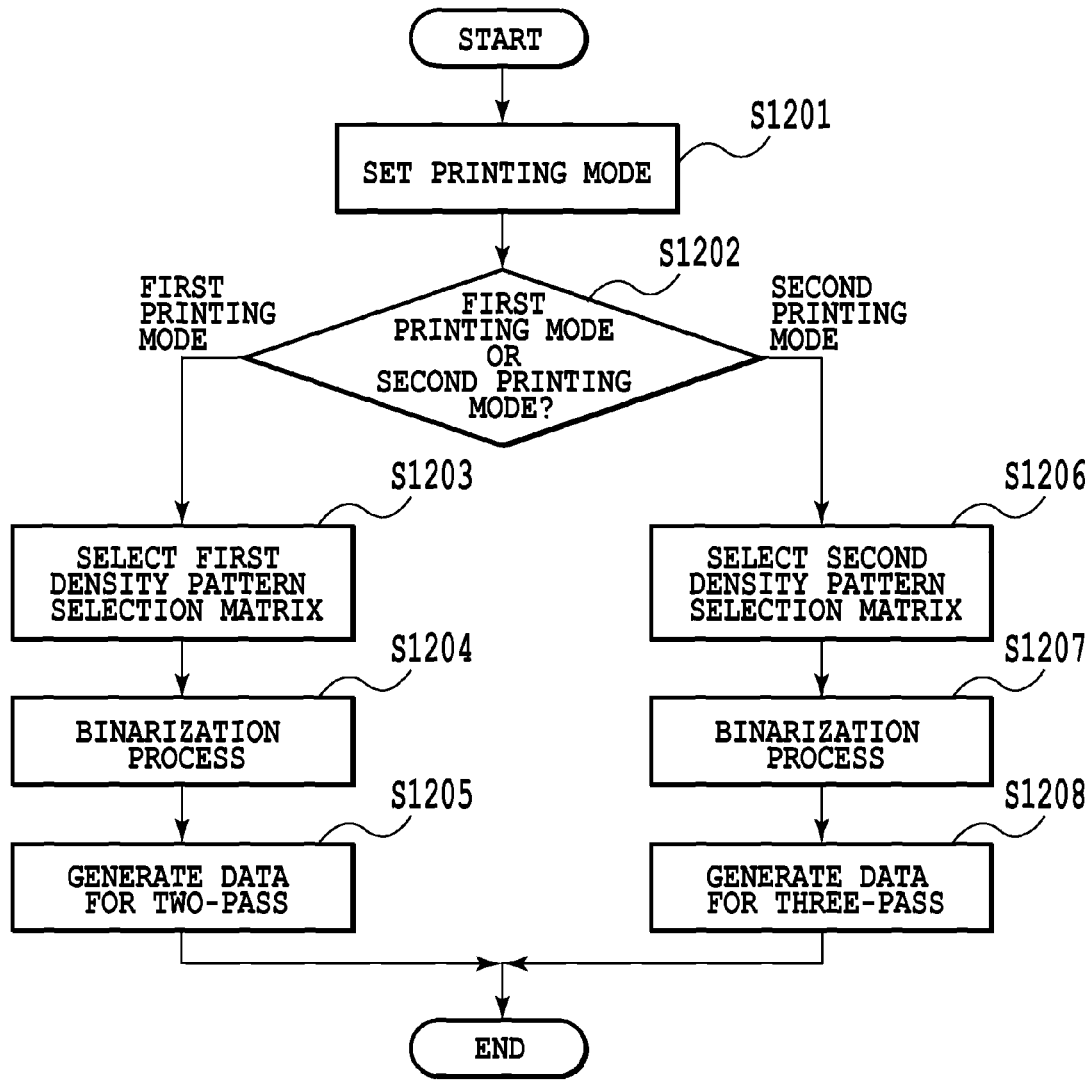
FIG. 11 is a flowchart showing the processing, for the first embodiment, performed to change a repetitive generation cycle for binary data in association with a change in the number of passes employed for multi-pass printing.

FIG. 11 is a flowchart showing the binary data generation processing according to this embodiment, especially, the processing for relating a repetition cycle of binary data generation to the number of passes for multi-pass printing and a conveying amount.

First, in a host apparatus, one printing mode is selected from a plurality of printing modes, for which different conveying amounts and different numbers of passes are designated (S1201). The printing mode may be selected by a user, or may be automatically by a host based on image data. Thus selected printing mode is set in the host as an operating mode to be used for printing. Available printing modes may be three or more, and for simplification of the description, it is assumed in the following description that two printing modes are available.

Sequentially, a check is performed to determine whether the printing mode set in the host is a first printing mode or a second printing mode (S1202). The first printing mode is a mode that performs two-pass printing as explained while referring to FIGS. 2 and 7. Specifically, the first printing mode is a mode in which printing for a unit area having a width corresponding to a first conveying amount in the conveying direction is completed by performing M scans (M is an integer of 2 or greater, and M=2 in this case) and by performing a conveying of a printing medium by the first conveying amount (feeding amount; Nf=256 pixels) between the M scans. On the other hand, the second printing mode is a mode that performs three-pass printing as explained while referring to FIGS. 8 and 10. Specifically, the second printing mode is a mode in which printing for a unit area having a width corresponding to a second conveying amount in the conveying direction is completed by performing N scans (N is a different integer from N and 2 or greater, and N=3 in this case) and by performing a conveying of a printing medium by the second conveying amount (feeding amount; Nf=168 pixels) between the N scans.

When it is determined at step S1202 that the first printing mode is set, processing control advances to step S1203, and a first density pattern selection matrix (first binarization pattern) is selected as a density matrix pattern for use. As described while referring to FIGS. 7 and 21, the size of the first density pattern selection matrix (first binarization pattern) is 32 pixels×32 pixels (64 pixels×64 pixels for binary data), which is a divisor of the first conveying amount (Nf=256 pixels). Therefore, the repetition cycle Ng of binary data generation and the size of binarization pattern can be made respective divisors of the first conveying amount (Nf=256 pixels). Then, a binarization process is performed using the first density pattern selection matrix to generate binary data (S1204). The binary data generation process at S1204 corresponds to the binarization process at S405 in FIG. 5. Following this, using a mask for two-pass printing, the binary data generated at step S1204 is divided into two scans, so that binary data for two-pass printing are obtained in accordance with two scans (S1205). The binary data division process at S1205 corresponds to the pass division process at S406 in FIG. 5.

When it is determined at step S1202 that the second printing mode is set, on the other hand, processing control is shifted to step S1206, and a second density pattern matrix (second binarization pattern) is selected as a density pattern matrix for use. As described while referring to FIG. 10, the size of the second density pattern selection matrix (second binarization pattern) is 42 pixels×42 pixels (84 pixels×84 pixels for binary data), which is a divisor of the second conveying amount (Nf=168 pixels). Therefore, the repetition cycle Ng of binary data generation and the size of the binarization pattern can be made respective divisors of the second conveying amount (Nf=168 pixels). Then, the binarization process is performed using the second density pattern selection matrix, and binary data is generated (S1207). The binary data generation process at S1207 corresponds to the binarization process at S405 in FIG. 5. Sequentially, using a mask for three-pass printing, the binary data generated at step S1204 is divided for three scans, and binary data for three-pass printing are obtained in accordance with three scans (S1208). The binary data division process at S1208 corresponds to the pass division process at S406 in FIG. 5.

As described for this embodiment while referring to FIGS. 7 to 10, the repetition cycle of binary data generation or the size of the binarization pattern is changed when the feeding amount is changed in association with the change of the number of passes. At this time, the repetition cycle of binary data generation or the size of the binarization pattern is changed to be a divisor of a feeding amount. Thereby, the repetition cycle of binary data generation (binarization pattern) can appear in all the unit areas in the same way. Therefore, non-matching is avoided between a unit (repetition cycle) for image processing, to attain a predetermined purpose related to an image quality, and an area (a unit area) for a printing operation, and the image printing purpose intended by a pattern for a binary data generation can be appropriately attained.

In this embodiment, the two-pass printing mode has been employed as the first printing mode, and the three-pass printing mode has been employed as the second printing mode. However, the number of passes used in this embodiment is not limited to these. For example, the first printing mode may be a four-pass mode and the second printing mode may be a three-pass mode. Further, the third printing mode may also be prepared, and the first printing mode may be a two-pass mode, the second printing mode may be a three-pass mode, and the third printing mode may be a four-pass mode. So long as a repetition cycle of binary data generation is a divisor of a conveying amount, any form can be employed.

As described above, according to this embodiment, binary data is generated to be employed for multi-pass printing, in which a print head scans a printing medium by a plurality of times while a printing medium is conveyed between respective scans, so that printing is completed in a unit area of the printing medium. For binary data generation, a density pattern in a density pattern selection matrix, which is pattern containing information for binary data generation is employed. When multi-pass printing modes, for which different conveying amounts are designated, are to be performed, a density pattern selection matrix responding to the conveying amount is selected, so that a repetition cycle of binary data generation in the conveying direction, of the density pattern selection matrix can be a divisor of the conveying amount. As a result, regardless of whether the conveying amount is changed, the repetition cycle of binary data generation is a divisor of the conveying amount. So long as this relationship is maintained, an image deterioration does not occur.

Second Embodiment

In a second embodiment of the present invention, as well as the first embodiment, a repetition cycle of binary data generation is changed in accordance with a change of a feeding amount. However, the contents of masks of individual colors are different in order to divide binary data for a plurality of scans. These masks are disclosed in Japanese Patent Laid-Open No. 5-31922 and Japanese Patent Laid-Open No. 2007-306551 by the applicant of the present application. These disclosed masks are created while taking into account the interference between a density pattern selection matrix and masks.

For the configuration wherein print data is generated using a mask that corresponds to a unit area for which printing is completed by multi-pass printing, an interference between a mask pattern and print data may occur.

FIGS. 12A to 12D are diagrams for explaining this interference problem. In FIG. 12A, a pattern for cyan binary data is shown, and in FIG. 12B, of two-pass mask cyan patterns, a cyan mask pattern for the first pass (50% is print permitting pixels) is shown. The size of the binary data pattern in FIG. 12A is 4 pixels×4 pixels, while the mask pattern in FIG. 12B has a size of 4 pixels×4 pixels in which print permitting pixels are arranged and has a pattern of pixels that are located in one to one correspondence to pixels in the binary data pattern.

In this case, at the first pass, AND data of the mask pattern and the binary data pattern, i.e., a dot pattern shown in FIG. 12C, is printed. That is, according to binary data in FIG. 12A, there are four dots to be formed, but 0 dots are actually formed at the first pass. On the other hand, at the second pass shown in FIG. 12D, the four remaining dots are formed. As described above, an interference occurs between the mask pattern and binary data (dot data), and thus, dots are unevenly formed in a specific scan. That is, dots are not evenly dispersed to a plurality of scans, and various adverse affects are provided, e.g., the original effects of multi-pass printing are not sufficiently demonstrated. For example, when ink is unevenly ejected in a specific scan due to this interference, ink dots are connected before being absorbed on a printing medium, and so-called beading occurs. Thus, the image quality is deteriorated, e.g., a grainy image appears.

There is the opposite case to the example shown in FIG. 12. That is, four dots are formed at the first pass, and 0 dots are formed at the second pass. Further, the interference occurs not only due to the data size, but also due to a combination of various binary data patterns and corresponding pass mask patterns.

Methods for solving this interference are described in Japanese Patent Laid-Open No. 5-31922 and Japanese Patent Laid-Open No. 2007-306551. According to these methods, when determining a mask pattern, the arrangements of print permitting pixels are determined based on the arrangement characteristic of ON ("1")/OFF ("0") in binary data. For example, when the binarization process is performed using a density pattern method, pixels for which binary data will be ON at the intermediate gradation can be roughly identified based on the dot arrangement characteristic in the density pattern. Therefore, the positions of print permitting pixels can be determined in a mask pattern by considering the interference of these positions and the positions of dots in the density pattern. Thus, the interference between the mask pattern and the print data can be reduced.

However, when a feeding amount is changed, binary data generated by the density pattern method might not be appropriate even though the above-described mask is employed. More specifically, the density pattern selection matrixes are repetitively used and binary data is generated at the repetition cycle according to the sizes of the matrixes. In this case, depending on a relationship between the repetition cycle of binary data generation and the feeding amount that has been changed, decreasing of the interference between print data and the mask, which is disclosed in Japanese Patent Laid-Open 5-31922 and Japanese Patent Laid-Open No. 2007-306551, may not be effectively performed. As a result, the binary data thus generated is not appropriate to be used for reducing the interference between the mask and the binary data.

Specifically, when the feeding amount is not the integer multiple of the repetition cycle of binary data generation, binary data present in one cycle might correspond to both a certain unit area and adjacent unit area to the certain unit area, for which printing is completed in the multi-pass printing. As a result, binary data at different positions (pixels) in the repetition cycle wholly correspond to the same mask that is used for printing the two areas. In this case, it is not effective that, as described in the patent publications, the positions of print permitting pixels for a mask are determined by considering the interference with binary data. Further, the interference between print data and the mask can not be appropriately reduced.

Because of these viewpoints, in this embodiment, the same processing as in the first embodiment is performed in the configuration wherein a mask is prepared and employed by considering an interference between a density pattern selection matrix and a mask. That is, when the feeding amount is changed in accordance with a unit area wherein printing image is completed, the repetition cycle of binary data generation is also changed.

A mask used for this embodiment is the one prepared by a method described in Japanese Patent Laid-Open No. 2007-306551. The method for manufacturing the mask will now be described.

A method of creating a mask that is used or created in a printing system according to this embodiment and several examples of the mask will be described below. Before that, a basic method for mask creation and a concept of calculation of repulsive force used in the method for mask creation will be described.

(Method of Creating Mask)

In the basic method for creating a mask described below, both a mask in which print permitting pixels are arranged and a dot arrangement pattern in which dots are arranged and which has the same size as that of the mask are referred as "plane" in order to simplify the description. Both print permitting pixels and dots that are arranged in these patterns are referred as simply "dot".

In the method of creating the masks according to the embodiment of the invention, for the planes of the masks and the dot arrangement pattern, first, the three planes of planes A1, A2 and A3 are set as shown in FIGS. 13A-13D. Then, repulsive forces are exerted between the dots within the identical plane and between the dots in the respective different planes. Also, the superposition of the dots of the different planes is permitted, and a repulsive force is exerted between such superposed dots. Thus, the arrangements of the dots within the respective planes are determined.

A method of determining the arrangements of the dots in the planes is broadly classified into two methods; a method which simultaneously determines arrangements of a plurality of planes (simultaneous generation), and a method which sequentially determines the arrangements of the respective planes (plane-by-plane generation). Moreover, for each of the above two generation methods, a manner of determining the arrangement of dots includes a method of arranging all the dots in the plane in a predetermined way and moving the arrangement, while making the entire plane being generated more dispersive (this method is hereinafter be referred to as an "arrangement moving method"). As other method, a method can be executed in which each dot is placed while making the entire plane being generated more dispersive (this method is hereinafter referred to as a "sequential arrangement method").

Arrangement Moving Method

The outline of an arrangement determination process for dots that is based on the arrangement moving method is as stated below.

For example, in case of determining the arrangements of the dots in the plane whose arrangement rate is 50%, an initial arrangement in which 1 bit data each being "1" are allocated at 50% of allocable positions is obtained by a binarization process, such as an error diffusion method, as to each of planes A1, A2 and A3. It should be noted that the reasons why the initial arrangements of the dots are obtained by employing the binarization technique are that the arrangements whose dispersiveness is favorable in an initial state to some extent can be obtained in correspondence with the binarization technique employed, and that a calculation time period or convergence time period till the final arrangement determination can be shortened in this way. In other words, the method of obtaining the initial arrangements is not essential in applying the present invention, but it is also allowed to adopt, for example, an initial arrangement in which the 1 bit data being "1" are allocated at random in the plane.

Then, a repulsive potential is calculated for all the dots in each of the planes A1, A2, A3 obtained as described above. Specifically, (i) Repulsive force is applied to the dots of the same plane depending on the distance between these dots.

(ii) Also, repulsive force is applied to the dots of different planes.

(iii) Different repulsive force is applied for the same plane and the different planes.

(iv) Dots of different planes are allowed to overlap one another, and repulsive force is applied to overlapping dots (two, three, or more dots) according to combinations of the overlapping dots.

Figure 14:
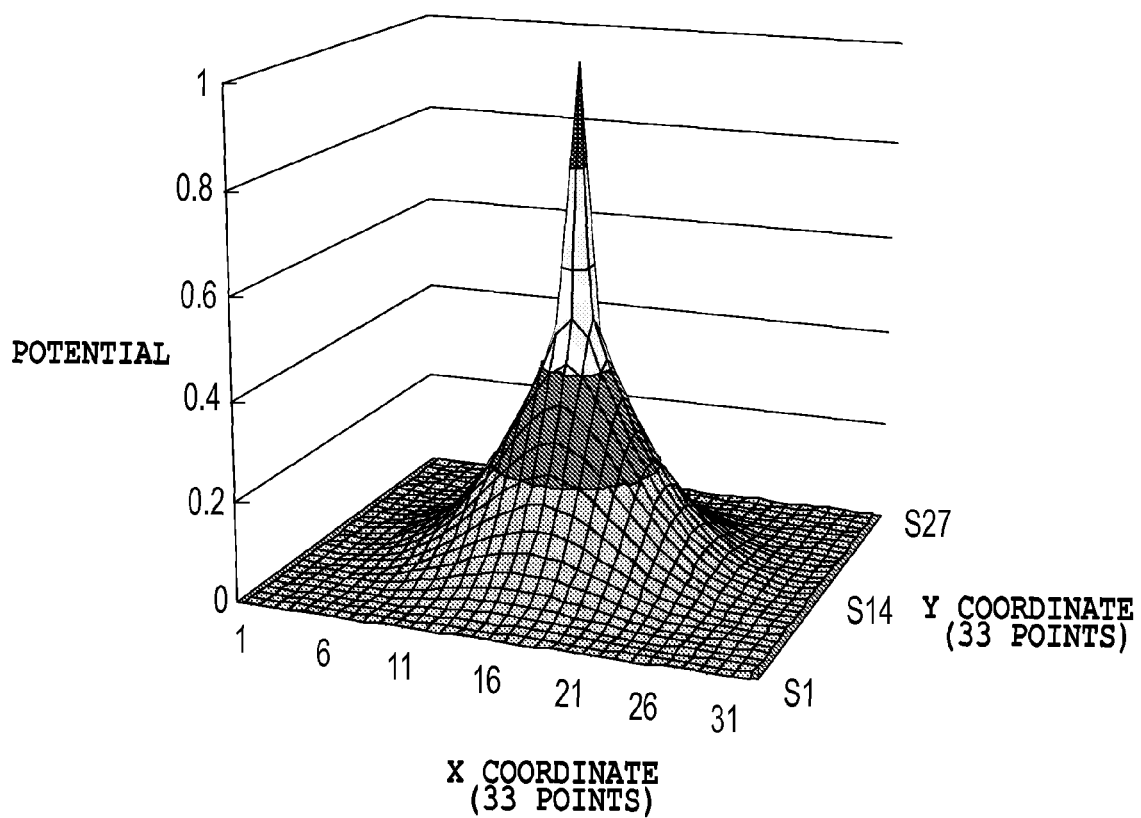
FIG. 14 is a schematic diagram showing a function of a basic repulsive potential E(r), according to a second embodiment of the present invention.

FIG. 14 is a diagram schematically showing a function for a basic repulsive potential $E(r)$ according to the present embodiment.

As shown in FIG. 14, for the repulsive force function that is defined in the present embodiment, the coverage of the repulsive force is up to $r=16$ (16 positions on which dots are arranged). The potential that attenuates depending on the distance basically brings a high energy state, that is, an unstable state when dots are arranged close to one another. Thus, the convergence calculation makes it possible to avoid selection of a dense arrangement as much as possible. The shape of the repulsive force is more desirably determined by the ratio of the dots to all the allocable positions.

Further, in the case of considering the arrangement of the dot in which plural dots overlap one another, it may occur that the number of positions where dots are arranged exceed that of positions where dots can be arranged (for a resolution of 1200 dpi (dot/inch), 1200×1200 possible positions in a 1-inch square), and then the arranged dots are made overlapped each other. Accordingly, in calculating the repulsive potential of each dot, considerations need to be given for possible overlapping of dots each other. Thus, the function is defined so as to have a finite repulsive potential at $r=0$. This enables dispersion with possible overlapping of dots taken into account.

The present embodiment executes calculations such that a repulsive potential $\alpha E(r)$ is applied to the dots on the same plane, a repulsive potential $\beta E(r)$ is applied to the dots on different planes, and a repulsive potential $\gamma s(n)E(r)$ is applied to overlapping dots. More specifically, a repulsive potential resulting from the presence of a certain dot is what is obtained by adding following potentials to the above repulsive potential: the repulsive potentials of dots on the same plane, dots on different planes, and an overlapping dots on different planes, respectively within the distance r from the certain dot.

For the above repulsive potentials, coefficients $\alpha$, $\beta$, and $\gamma$ are weighting coefficients and in the present embodiment, $\alpha=3$, $\beta=1$, and $\gamma=3$. The values $\alpha$, $\beta$ and $\gamma$ affect the dispersiveness of dots. The values $\alpha$, $\beta$ and $\gamma$ can be actually determined by, for example, experimental optimization based on print images printed using the masks.

The coefficient $s(n)$ is used for an multiplying in addition to $\gamma$ in order to disperse overlapping dots. The coefficient $s(n)$ has a value corresponding to the number of overlaps so as to increase the degree of dispersion of the dots consistently with the number of overlaps. The present inventor experiments show that an appropriate dispersion can be achieved by using $s(n)$ determined by either of the two equations:

$$s(n) = \sum_{i=1}^{n} nCi \text{ or } s(n) = \sum_{i=1}^{n-1} nCi \quad \text{[Equation 1]}$$

That is, when the n denotes the number of overlaps, the sum of numbers of combinations is denoted by $s(n)$. Specifically, for an object dot for which repulsive force is to be calculated, overlapping dots (which are located at the same position as that of the object dot on the same plane or different planes) and overlapping dots located at the distance r from the object dot are searched. In this case, n denotes the number of overlaps common to overlapping of the object dot and the dot on the same plane and the different planes, which overlap the object dot at the same position, and overlapping of the dots which are located at the distance r from the object dot, on respective planes, and overlap each other in the same manner. Then, for these two positions, repulsive forces resulting from the overlapping dots are considered.

In the case of considering an example in which for two positions, dots are present commonly on a first plane, a second plane and a third plane, n is defined as 3. Then, repulsive force attributed to the overlapping of the three dots is allowed to act on these positions. Here, when the repulsive force resulting from the overlapping of the three dots is considered, the repulsive force of the overlapping of every two dots and the repulsive force of each dot are considered to act in a multiplexing manner together with the repulsive force of the overlapping of the three dots. In other words, with the third plane not taken into account, the overlapping may be considered to occur between two dots on the first plane and the second plane. With the second plane not taken into account, the overlapping may be considered to be the one between two dots on the first plane and the third plane. With the first plane not taken into account, the overlapping may be considered to occur between two dots on the second plane and the third plane. To calculate the multiplexing effect of overlapping of the dots, the repulsive force resulting from the combination of overlaps is defined and s(n) such as the one described above is used. The experiments show that this makes it possible to provide a highly dispersive dot arrangement.

When the total energy is determined which is equal to the sum of the repulsive potentials of all the dots, as described above, processing is executed to reduce the total energy.

This processing involves sequentially shifting each of the dots to one of the allocable positions located at a distance r of at most 4, at which position the repulsive potential of the shifted dot most decreases. This processing is repeated to reduce the total energy that is equal to the sum of the repulsive potentials of all the dots. In other words, the process of gradually reducing the total energy corresponds to the process of sequentially making the arrangement of the dots more dispersive, that is, the process of gradually reducing low frequency components of the dots.

Then, the rate of a decrease in total energy is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed. Finally, respective planes with the rate of a decrease in total energy equal to or less than the predetermined value are set as final arrangements of the dots.

FIGS. 13A to 13D are diagrams schematically showing the repulsive potential calculation and total energy attenuating process, described above. More specifically, these figures include perspective views showing the three planes A1, A2, and A3 according to the present embodiment and plan views specifically showing movement of the dots. In the figures, the smallest squares show allocable positions of the dots. Positions overlapping each other among three overlapping planes correspond to the same allocable positions among the planes.

Figures 13A, 13B:
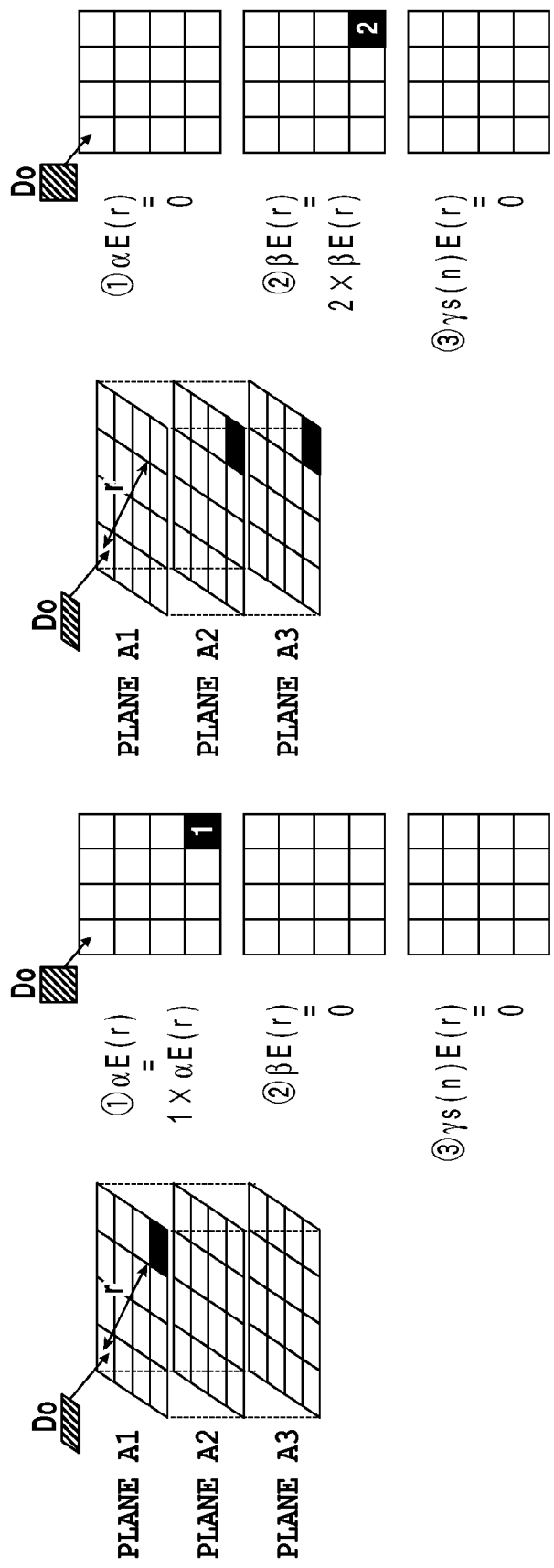

FIG. 13A illustrates that when dots are present on the same plane, the repulsive force of these dots is added to (increases) the repulsive potential. In the example shown in the figure, one dot is present on the same plane A1 on which the dot Do of an object position is present at the distance r from that position. In this case, $\alpha=3$ is applied, and a potential $1 \times \alpha E(r)$ is added as the potential of the object dot Do.

FIG. 13B is a diagram illustrating that dots are present on planes (planes A2 and A3) different from that on which the object dot Do is present and that a repulsive potential is added on the basis of the relationship between the object dot and these two dots. The relationship between the object dot and these two dots is that between different planes. Then, $\beta=1$ is applied and a potential $2 \times \beta E(r)$ corresponding to the two dots is added.

FIG. 13C is a diagram illustrating that dots are present on the same plane on which the object dots is present and on planes different from that on which the object dot is present as is the case with the above two figures, and in addition, a dot is present on the same position of a different plane and then that dot and the object dot overlap each another, and illustrating the repulsive potential based on the relationship among these dots. Not only the conditions shown in FIGS. 13A and 13B are met but an dot is present at the same position on the plane A3, which is different from the plane A1 with the object dot Do present. Thus, the following potentials are added: the repulsive potential $1 \times \alpha E(r)$ of one dot on the same plane, the repulsive potential $1 \times \beta E(0)$ of one dot on the different plane at the same position, the repulsive potential $2 \times \beta E(r)$ of two dots on the different planes, and the repulsive potential $\gamma s(2) \times E(r)$ of overlapping to which $\gamma=3$ is applied at a overlap number n=2. As s result, in the dot arrangement shown in FIG. 13C, the sum of the repulsive potentials associated with the presence of the object dot Do is $1 \times \beta E(0) + 1 \times \alpha E(r) + 2 \times \beta E(r) + \gamma s(2) \times E(r)$.

FIG. 13D is a diagram illustrating that in the dot arrangement shown in FIG. 13C, movement of the dot Do changes the sum of repulsive potentials of this dot. As shown in FIG. 13D, when the dot Do (located on the plane A1) shifts to an adjacent position on the same plane, the sum of the repulsive potentials associated with the presence of the dot Do changes into $\beta E(1) + 1 \times \alpha E(r2) + 2 \times \beta E(r2)$ because the distance changes into r2 from r and the number n of overlaps becomes 0. For the dot arrangement shown in FIG. 13C, the sum of the repulsive potentials $1 \times \beta E(0) + 2 \times \beta E(r) + 1 \times \alpha E(r) + \gamma s(2) \times E(r)$ is compared with the sum of the repulsive potentials resulting from movement of the dot Do in FIG. 13D. This determines a change in the sum of the repulsive potentials after the movement.

In the above description, the sum of the repulsive potentials is obtained by determining the sum of energies of the dots between two positions, or of the dots among three positions when the dot is moved. However, this is for simplification and the sum of the repulsive potentials is of course obtained by integrating the repulsive potentials on the basis of the relationship between the dot of interest and dots including those of other possible positions other than the above dots.

If, of the dots for each of which the sum of the repulsive potentials is calculated as shown in FIGS. 13A to 13C, for example the dot Do shows the largest repulsive potential sum, changes in repulsive potential after the movement of the position of the pattern Do is determined as described in FIG. 13D and the dot Do is moved to the position with most decreasing of repulsive potential sum. This processing is repeated to enable a reduction in the total energy of the three planes. That is, the dot arrangement of the superposing of the three planes is appropriately distributed with few low frequency components.

The dots are appropriately dispersed among the three superposed planes A1, A2, and A3, and thus, the dots are also appropriately dispersed among the complementary masks in the case that these three masks are respectively masks for the multi-pass print of two-passes. Further, the dots of superposing of an arbitrary number (2, 3, 4, or 5) of these 6 planes are also appropriately dispersed and have few low frequency components.

In the above description, the arrangement moving method is applied to three plane masks which are used for the first pass and which are included in the masks for two passes. However, the arrangement moving method is not limited to this aspect but is applicable to all the planes to determine the arrangement of the dots. For the masks for two pass printing according to the present embodiment, the arrangement moving method is applicable to six plane masks for two passes. In this case, the range within which the dots are moved is not limited to nearby pixels. Arranged pixels may be moved on the basis of the relationship between the corresponding dots on different planes. Specifically, for example, a dot on one plane may be moved to a pixel on the same plane on which no dot is placed, and a dot placed on a pixel of another plane which corresponds to the moved pixel may be moved to a pixel on the same plane which corresponds the pixel on which the above dot was located. This makes it possible to change the arrangement relationship among the dots on all the planes involved in the repulsive potential calculation. Consequently, the positions of the dots can be changed to one another so as to minimize the potential energy.

Sequential Arrangement Method

This method is a method which sequentially arranges dots in a part of a plane where no dots have been arranged yet, as described above. This method sequentially places an dot on three planes one by one, for example, shown in FIGS. 13A to 13C and repeats this operation to arrange the dots according to arrangement rate of each plane. In this case, before a dot has been arranged, calculation is made of the possible repulsive potential between the dot of that position and each of the dots already arranged on the planes A1, A2, and A3. The repulsive potential can be calculated in the same manner as described above for the arrangement moving method. The difference between the present method and the arrangement moving method is that with reference to the example shown in FIGS. 13A to 13C, if in contrast to the above arrangement moving method, the dot Do, shown in these figures, has not been placed yet but is to be newly placed, the repulsive potential is calculated on the basis of the relationship between the dot Do and dots already arranged on the same plane A1 and on the different plane A2 or A3. As is also apparent from the description, at the initial stage where no dots have been arranged yet, the repulsive potential has the same value regardless of the position of the dot.

Next, among the repulsive potentials calculated under the assumption that the dot is placed on each of positions of the planes, a position having the minimum potential energy is determined. If plural positions show the minimum energy, random numbers are used to determine one of the plural positions. In the present embodiment, the position with the minimum energy is determined under the condition that on the same plane, no dot is placed on a position on which an dot has already been placed. This is because depending on a parameter such as the weighting coefficient or repulsive potential function, in the repulsive potential calculation, overlapping of dots on the same plane may result in the minimum energy as a result of the relationship between the object dot and dots on the other planes and because in this case, the overlapping is prohibited because only one dot is allowed to be placed on the determined position. An dot is placed on the determined position with the minimum potential energy. That is, data on that position is set to "1". Then, the method determines whether or not one dot has been placed on each of the planes A1, A2, A3. If this placement has not been finished, the processing is repeated.

When one dot has been sequentially placed on the planes A1, A2, and A3 in this order, the method determines whether or not dots have been arranged on up to 50% of all allocable positions. Once 50% of the dots have been arranged on each of the three planes, the present process is finished.

The above described sequential arrangement method also makes it possible to produce planes having characteristics similar to those of planes produced by the above arrangement moving method. That is, for the three planes obtained by the sequential arrangement method, the dots are appropriately dispersed in the superposed planes.

The above description is made in which a plane of the density pattern and a plane of the mask are not distinguished from each other. However, as explained in an example below, the plane of the density pattern among the above planes or dots in the plane of the density pattern is previously determined as the density pattern, during the calculation of the repulsive force. That is, during the calculation of the repulsive force, dots in the plane corresponding to the density pattern are taken as fixed dots and the arrangement of these dots are not determined by moving of dot positions and dot arrangements in accordance with the repulsive potential energy. That is, in the present embodiment, the target plane of determining dot arrangement is the plane corresponding to the mask, and the plane corresponding to the density pattern or dots in that plane is a target of the calculation of the repulsive force. More specifically, when determining a dot arrangement of the plane corresponding to a mask, the term of the weighting coefficient $\alpha$ for calculating the repulsive potential is applied to the plane of the mask. Further, terms of the coefficients $\beta$ and $\gamma$ are applied for the calculation of the repulsive potential between the plane of the mask and each of the plane corresponding to other mask and the plane corresponding to the density pattern.

Thus, the mutual interference can be reduced between the arrangement of print permitting pixels in a mask to be created and the density pattern, and also the arrangement pattern itself of print permitting pixels of the mask is made highly dispersed.

A specific example of methods for creating a mask by using above-mentioned basic method, in accordance with the present embodiment, will be described below for the method of creating 100% even mask for two pass printing.

Summary of the Embodiment

This embodiment relates to multi-pass printing of two-pass in which an image is completed by twice of scanning by using one print head equipped with a nozzle array ejecting cyan (C) ink as a printing element. A mask used for the two-pass printing has a pattern whose interference with a density pattern is reduced and which is well dispersed. This prevents dots formed by each scanning from being unevenly distributed in number. Furthermore, since dots are dispersedly formed in each scanning, even if there is a deviation of printing position for example, texture that may be caused by the deviation is visually unobtrusive, thus suppressing adverse effects on image quality.

In two-pass printing, the nozzles of the print head are divided into a first group of nozzles and a second group of nozzles, each group including 256 nozzles. Masks (two masks C1 and C2) are associated with respective groups and the size of respective masks C1 and C2 in a sub-scan direction (conveying direction) is equivalent to 256 pixels that are the same as the number of the nozzles of respective groups. Since the masks C1 and C2 are complementary each other, superposing these masks enables printing of the area corresponding to 256 (lateral) pixels×256 (longitudinal) pixels to be completed. As shown in FIG. 2, printing is performed on a area A of a print medium by using the mask C1, the print medium is conveyed by the length of 256 pixels and then printing is performed on the area A by using the mask C2. Printing of an image is completed by the twice pass.

Method of Creating Mask

A method of creating the mask in accordance with this embodiment will be described regarding the case in which the mask is created by using above-mentioned sequential arrangement method.

Figure 15:
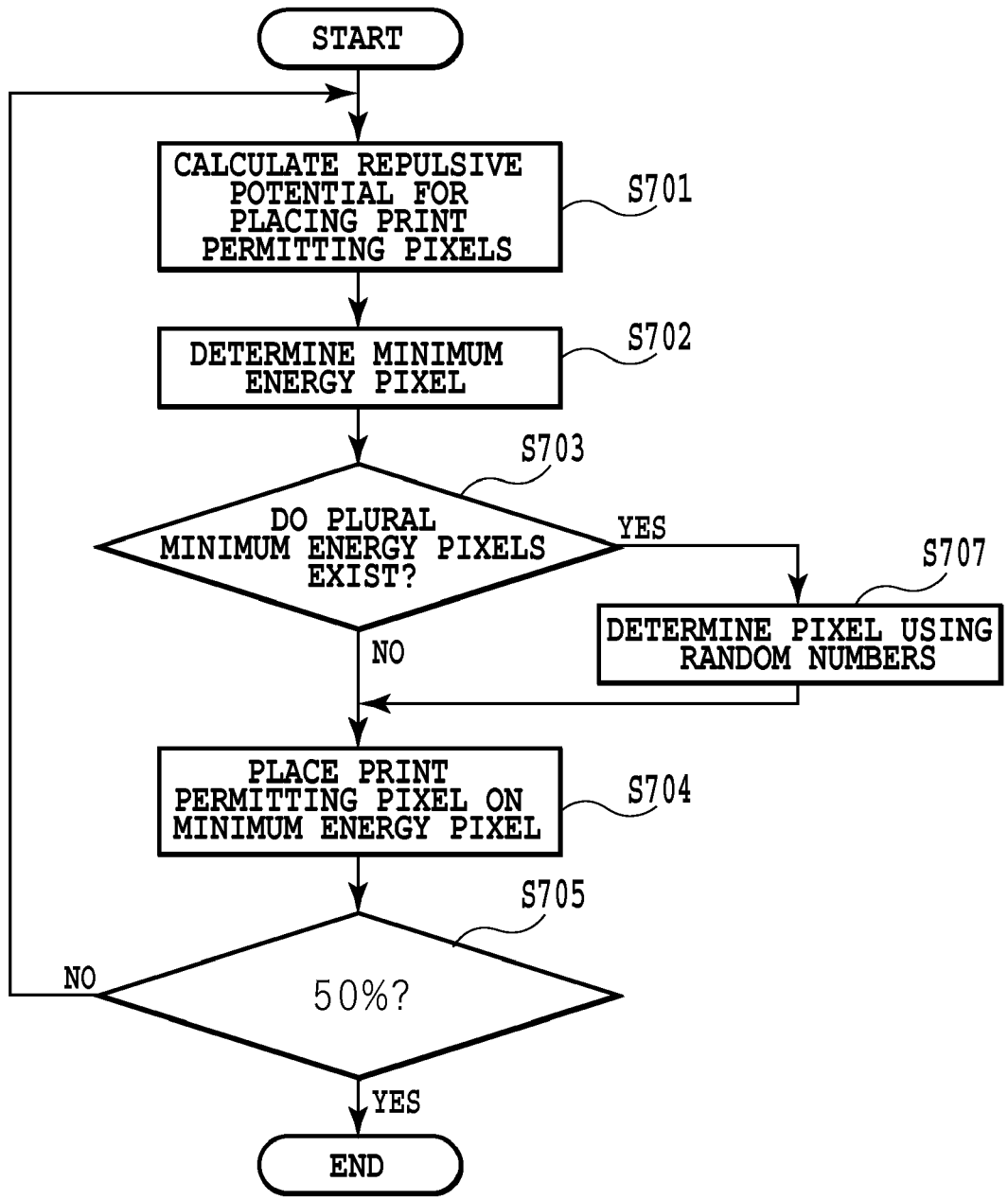
FIG. 15 is a flowchart showing the processing, according to the second embodiment, performed to arrange print permitting pixels using a sequential arrangement method.

FIG. 15 is a flow chart showing arrangement determination processing of print permitting pixels according to the sequential arrangement method in accordance with this embodiment.

In processing shown in FIG. 15, the arrangement of print permitting pixels is performed at 50% of arrangement rate in such a way that a print permitting pixel is sequentially arranged on one plane. In step S701, firstly, the plane of mask C where print permitting pixels will be arranged and the plane of a density pattern are specified and repulsive potential is calculated for the arrangement of print permitting pixels in these planes. At this time, as described above, dots have been already arranged on the plane corresponding to the density pattern. Thus, while the dots remain fixed, repulsive force is calculated between the dots and print permitting pixels to be arranged on the plane of mask C.

Figure 16:
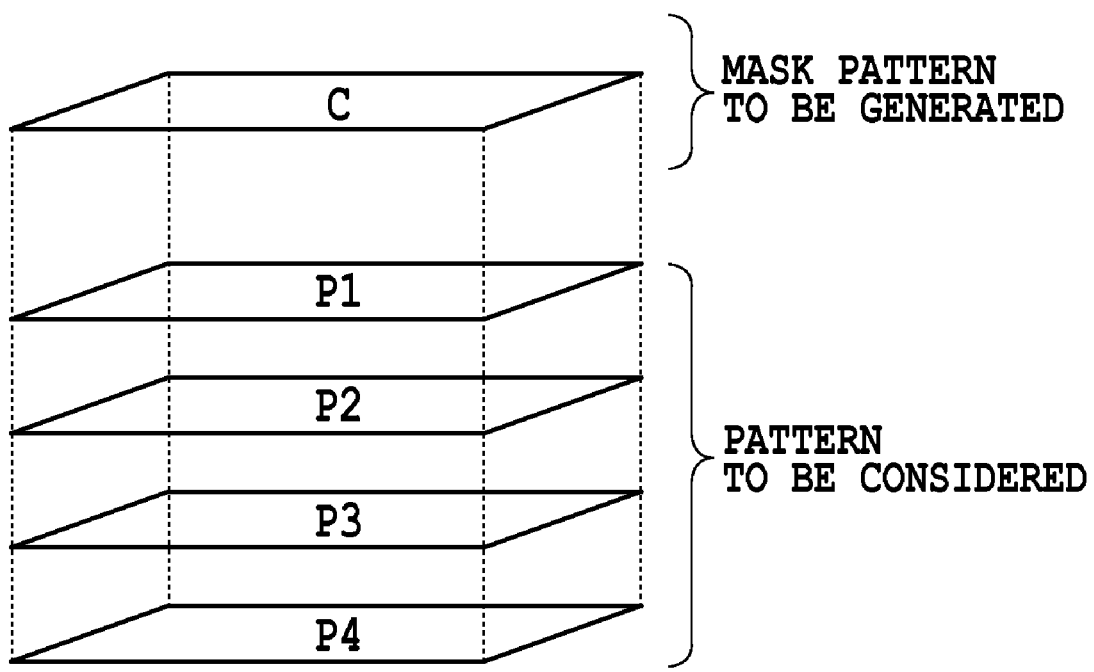
FIG. 16 is a conceptual diagram, for the second embodiment, for the calculations performed for a mask C.

FIG. 16 is a diagram showing a concept for calculating repulsive force regarding the arrangement of print permitting pixels on the mask C. In calculating repulsive force, the density patterns (herein after also referred as "dot arrangement pattern") of planes P1 to P4 to be considered are fixed patterns. These dot arrangement patterns of planes P1 to P4 are predetermined for each of levels shown by index data. In processing in which the arrangement of print permitting pixels of the mask C is determined, the repulsive potential between print permitting pixels on the mask pattern C and the repulsive potential between print permitting pixels on the mask pattern C and dots on the planes P1 to P4 are calculated. Then, as described above, the arrangement of print permitting pixels on the mask C is determined based on the result of repulsive potential calculation.

FIG. 17 shows dot arrangement patterns according to the present embodiment. The dot arrangement patterns shown in FIG. 17 are composed by assembling a minimum unit pattern of 2 pixels×2 pixels, which is described above in reference with FIG. 6, at four units in longitudinal direction and four units in lateral direction. More specifically, in the patterns shown in FIG. 17, pattern types 0 to 3 shown in FIG. 6 are arranged for respective index data levels (pattern of level 0 is not shown; all pixels are "white"), based on a rule according to the density pattern selection matrix to make the pattern the size of which is 64 pixels×64 pixels. It should be noted that FIG. 17 and figures that follow FIG. 17 show the pattern size of which is 8 pixels×8 pixels for simplifying illustration.

Of the dot arrangement patterns for respective levels shown by index data, described above, the dot arrangement pattern of size of 256 pixels×256 pixels corresponds to 256 pixels×256 pixels of the mask C. The arrangement of print permitting pixels of the mask C is determined by considering the planes P1 to P4 that are dot arrangement patterns for respective gradation levels. Specifically, the arrangement of print permitting pixels is determined by using above-mentioned calculation of repulsive potential. The dot arrangement patterns to be considered, however, are not the repetitive 8 pixels×8 pixels patterns shown in FIG. 17. This is because inequality of repulsive potential is removed beforehand, which will be described later in detail.

FIG. 18 is a diagram showing the dot arrangements of the planes P1 to P4 that are subjected to repulsive potential calculation in determining the arrangement of print permitting pixels on the mask C. The dot arrangement patterns of the planes P1 to P4 are obtained by separating the dot arrangement pattern shown in FIG. 17 into patterns that are exclusive each other. Specifically, for the original dot arrangement pattern shown in FIG. 17, i.e. the dot arrangement pattern used in the binary data expansion processing shown in FIG. 5, the patterns (also referred as to "dot pattern for calculation") are represented by the difference between respective dot arrangement patterns of respective gradation levels. The pattern (L1-L0) of the plane P1 is obtained by removing dots of the dot arrangement pattern of gradation level 0 (L0) from dots of the dot arrangement pattern of gradation level 1 (L1). Similarly, the pattern of the plane P2 is the dot pattern corresponding to the difference between the pattern of gradation level 2 (L2) and the pattern of gradation level 1 (L1); the pattern of the plane P3 is the dot pattern corresponding to the difference between the pattern of gradation level 3 (L3) and the pattern of gradation level 2 (L2); and the pattern of the plane P4 is the dot pattern corresponding to the difference between the pattern of gradation level 4 (L4) and the pattern of gradation level 3 (L3). Since the planes P1 to P4 are exclusive patterns each other, dots would be arranged at the arrangement rate of 100% that is the same rate of gradation level 4, when superposing all the planes.

In calculating repulsive potential, the dot arrangement patterns are made to be exclusive in order to prevent the inequality of the number of print permitting pixels arranged and the reduction of dispersibility due to biased repulsive potential in a certain region. That is, each dot arrangement pattern shown in FIG. 17 preserves the dot arrangement of the former level when the level is increased. Therefore, if the dot arrangement pattern itself is used for calculating repulsive potential, the preserved dots are regarded as overlapping dots on different planes. However, since dots of the dot arrangement pattern to which a mask is applied by masking processing are those of one of a plurality of levels, they do not have multiplex relation with the mask or do not interfere with the mask, as described above. Therefore, if the dot arrangement pattern itself is used for calculating repulsive potential, the values of repulsive potential calculated is biased in a certain region relative to the actual relation, thus adversely causing the inequality of the number of print permitting pixels to be arranged and the reduction of dispersibility.

Although the dot arrangement pattern in which the dot arrangement of the former gradation level is preserved when the gradation level is increased, is shown in the above example, the present invention is not limited to the above example and also can be applied to the dot arrangement pattern in which the dot arrangement of the former gradation level is not preserved.

Figure 19:
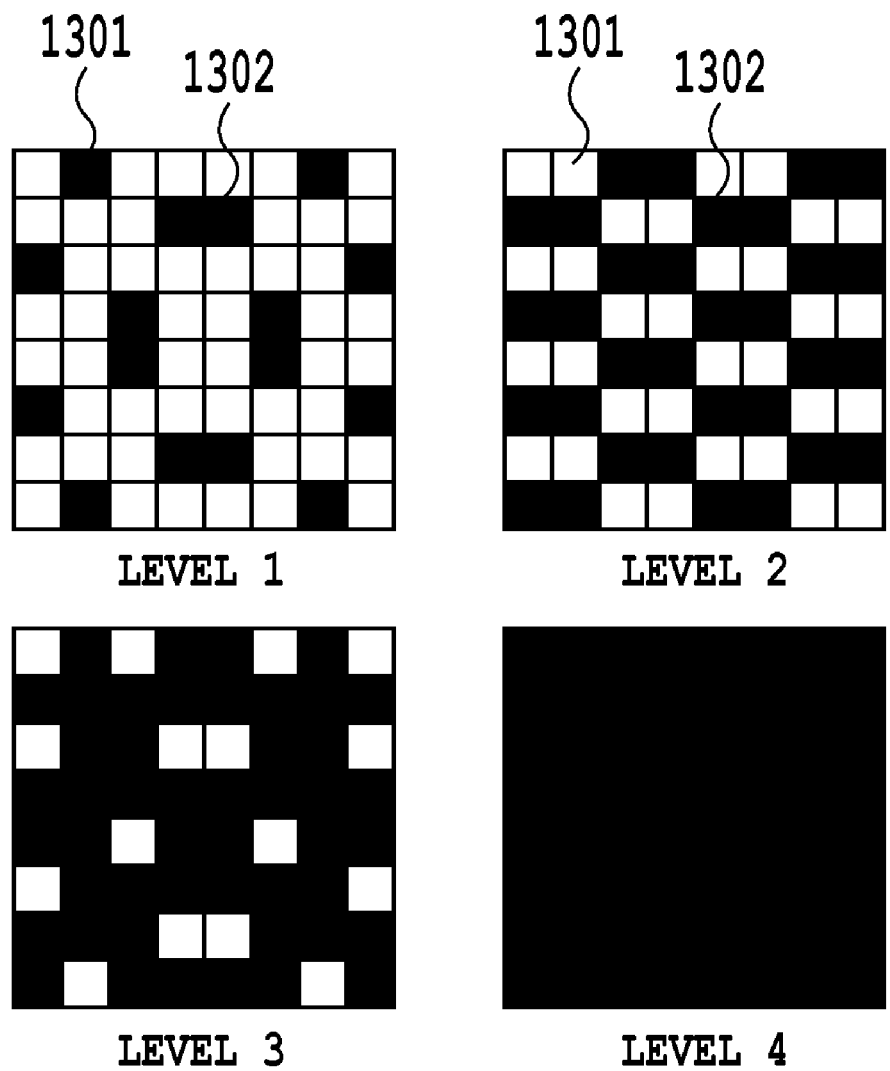
FIG. 19 is a diagram showing other dot arrangement patterns, according to the second embodiment, that are based on index data.

FIG. 19 shows one example of the dot arrangement patterns in which the dot arrangement of the former gradation level is not preserved as it is when the gradation level is increased. As shown in FIG. 19, in the arrangement pattern of level 1, for example, dots are arranged on pixels 1301 and 1302. Compared to this arrangement, in level 2 where the level is increased by one level, dots are not arranged on the pixel 1301 and the dot arrangement of level 1 is not preserved, while dots are arranged likewise as the dot arrangement of level 1 on the pixel 1302. Thus, there is a dot arrangement pattern in which the dot arrangement of the former level is not preserved completely (as it is).

In using the dot arrangement pattern in which the dot arrangement is not preserved as it is when the level is increased, the dot arrangement pattern and exclusive pattern thereof are used for calculating repulsive potential. In calculating repulsive potential, the pixels (for example pixel 1301) which do not preserve the dot (arrangement) has the same influence on print permitting pixels of the mask, if the distance is not considered. Meanwhile, the pixels (for example pixel 1302) which preserve dots has overlapping and multiplex relation with print permitting pixels of the mask in calculating repulsive force. From this point of view, a dot arrangement pattern and the exclusive pattern thereof are used as planes for calculating repulsive force.

FIG. 20 shows 8 planes used for calculating repulsive potential in the case of the dot arrangement patterns shown in FIG. 19. In FIG. 20, the plane P1 has the dot arrangement pattern of level 1 shown in FIG. 19 and the plane 2 has the exclusive dot pattern thereof. Similarly, the plane 3 has the dot arrangement pattern of level 2 and the plane 4 has the exclusive dot pattern thereof; the plane 5 has the dot arrangement pattern of level 3 and the plane 6 has the exclusive dot pattern thereof; and the plane 7 has the dot arrangement pattern of level 4 and the plane 8 has the exclusive dot pattern thereof.

When the dot arrangement patterns shown in FIG. 19 are used, the calculation of repulsive potential for determining the arrangement of print permitting pixels of the mask C is performed for the plane of the mask C and the above-mentioned 8 planes, on which the dot arrangements are fixed, for the plane of the mask C.

Referring to FIG. 15 again, after calculating repulsive potential as described above, step S702 determines the position (pixel) having minimum potential energy among the repulsive potentials calculated when print permitting pixels are placed in the arrangement position of the mask C. Then, step S703 determines if there is more than one position having minimum potential energy or not. If there is more than one position, step S707 determines one position of them by using a random number. Then, step S704 arranges the print permitting pixel on the determined position having minimum potential energy.

Step S705 determines if print permitting pixels are arranged on the plane of the mask C up to 50% of the positions where pixels can be arranged or not. If not, the processing in step S701 and the subsequent steps is repeated. When print permitting pixels are arranged up to 50%, this processing is terminated.

When the mask C1, which is the mask used for the first pass of two-pass printing, is set as described above, the mask C2, which has complementary relation with the mask C1, can be specified based on the mask C1.

According to the method for creating a mask in this embodiment, as described above, firstly, the arrangement of print permitting pixels in the mask C created is well dispersed depending on above-mentioned weighting of α, β and γ. Secondly, print permitting pixels and dots are also well dispersed on the superposing of the mask C and the planes P1 to P4 of dot arrangement patterns considered in creating the mask C. That is, both the logical product and the logical sum of the print permitting pixels arranged on the mask C and the dots arranged on each of the planes P1 to P4 are dispersed. These logical product and logical sum can be obtained between print permitting pixels arranged on the mask and dots arranged on each of the planes, for example, when 256 pixels×256 pixels of the mask are associated with 256 pixels× 256 pixels of each of the planes.

The good dispersibility of above-mentioned logical sum ensures that, in both the mask C1 and the mask C2 that has complementary relation with the mask C1, the arrangement of print permitting pixels is well dispersed relative to the dot arrangement patterns shown in FIGS. 17 and 17. This can suppress the biased formation of dots by a specific scanning. Further, the good dispersibility of above-mentioned logical product also ensures that the dot pattern obtained by mask-processing for dot data according to the dot arrangement pattern shown in FIGS. 17 and 19, with the use of the mask C1 (C2) are well dispersed. Such effects of the present invention is applicable to each embodiment describe below.

Consequently, when the dot patterns generated according to the dot arrangement patterns in FIG. 17 or 19 are printed, as to dots formed by each scanning, their number is not unequally high in a specific scanning and dots are well dispersed, by using the mask of this embodiment. The good dispersibility makes texture that may occur due to various factors visually unobtrusive, thus suppressing adverse effects on image quality.

As described above, according to the mask creating method disclosed in Japanese Patent Laid-Open No. 2007-306551 a mask is obtained by considering the arrangement of a density pattern. Thus, the interference between a mask and binary data generated using a density pattern can be reduced. As described above, a mask employed for this embodiment has a size corresponding to the density pattern selection matrix size, or corresponding to the repetition cycle. That is, in a mask having a certain size, printing permitting pixels are determined in accordance with the size of a corresponding density pattern selection matrix (or a corresponding dot arrangement pattern). Therefore, when the feeding amount is changed, the corresponding mask is used, and accordingly, the size of a density pattern selection matrix is changed. Thereby, such a phenomenon can be prevented that binary data that have different repetition cycles based on a density pattern selection matrix are corresponding to one mask that is used to print unit areas. As a result, the arrangement of print permitting pixels that is determined for a mask by considering the interference with binary data becomes effective, and the interference between print data and the mask can be appropriately reduced.

In this embodiment, the method described in Japanese Patent Laid-Open No. 2007-306551 has been employed as an example mask manufacturing method while taking a density pattern into account. The method is not limited to this, and a method described in, for example, Japanese Patent Laid-Open No. 5-31922 may also be employed.

When binary data is generated by a dither method, masks can also be generated by considering the threshold value of a dither pattern. That is, for image data at the individual gradations, the ON/OFF positions of print data to be binarized by the dither pattern can be roughly identified in advance based on the characteristic of the dither pattern. Therefore, a mask pattern can be determined by considering the ON/OFF arrangement of print data that can be obtained in advance based on the dither pattern, i.e., by considering an interference of the threshold value and the arrangement relative to print permitting pixels in a mask pattern.

Other Embodiment

In the first and second embodiments, an example for obtaining binary data using the density pattern method has been described. However, the binarization processing is not limited to this example. The present invention can be applied for any other mode that includes a pattern of a specific size, which is repetitively employed for binary data generation to provide periodicity for binary data generation. For example, in the case of a dither method for employing a dither pattern as a binarization pattern, the size of a dither pattern can be changed in accordance with a change of a feeding amount. Assume in the first embodiment that the binarization processing is to be performed using a dither pattern. In this case, a dither pattern of 64 pixels×64 pixels is selected at step S1203 in FIG. 11, and a dither pattern of 84 pixels×84 pixels is selected at step S1206. In this manner, the size of a dither pattern to be employed and the neighbor pattern can be a divisor of a conveying amount.

Furthermore, in the above embodiments, a value of a cycle of binary data obtained based on a density pattern selection matrix has been a divisor smaller than a value of a feeding amount. However, a value of a cycle is not limited to this, and a repetition cycle and a feeding amount may be the same value. For example, when the feeding amount is equal to a length of 256 pixels, the repetition cycle of binary data generation for the two-pass printing in the above embodiment has been defined as a length of 64 pixels. However, this cycle may be defined as a length of 256 pixels that is equal to the feeding amount.

In addition, in the above embodiments, the binary data generation processing in FIG. 11 has been performed by a host; however, this processing may be performed by a printing apparatus. In this case, it is preferable that the printing apparatus employ a special hardware component, such as ASIC, to perform the binary data generation processing. When the printing apparatus performs the binary data generation processing shown in FIG. 11, this apparatus serves as an image processing apparatus (image data generation apparatus).

Further Embodiments

The present invention is put into practice by executing program codes of software such as those shown in FIGS. 5 and 11, for example, which implements the functions of the above described embodiments, or by a storage medium storing such program codes. Further, the present invention is also put into practice by that the computer (CPU or MPU) of the system or apparatus reads the program codes to execute them. In this case, the program codes of the software themselves implement the functions of the above described embodiments, so that the storage medium storing the program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-207157, filed Aug. 8, 2007, which is hereby incorporated by reference herein in its entirety.

What is claimed is:

1. A data generating apparatus for generating binary data used for performing printing on a printing medium by using a printing head in which a plurality of nozzles are arranged, said apparatus comprising:
   a setting part for setting a printing mode, in which a plurality of movements of the printing head are performed and the printing medium is conveyed by a conveying amount smaller than an arranging width of the plurality of nozzles of the printing head between each of the plurality of movements, to perform printing on an area corresponding to the conveying amount;
   a selection part for selecting a binarization pattern having a number of pixels corresponding to a divisor of a number of pixels that corresponds to the conveying amount in the printing mode set by said setting part, from a plurality of binarization patterns that differ in a number of pixels in a conveying direction of the printing medium from each other; and
   a generation part for generating binary data corresponding to the area by using a binarization pattern selected by said selection part.

2. A data generating apparatus for generating binary data used for performing printing on a printing medium by using a printing head in which a plurality of nozzles are arranged, said apparatus comprising:
   a setting part for setting one printing mode of a plurality of printing modes including a first printing mode, in which M (M is an integer 2 or greater) times of movements of the printing head are performed and the printing medium is conveyed by a first conveying amount smaller than an arranging width of the plurality of nozzles of the printing head between each of the M times of movements, to perform printing on an area having a width corresponding to the first conveying amount and a second printing mode, in which N (N is an integer greater than M) times of movements of the printing head are performed and the printing medium is conveyed by a second conveying amount, which is smaller than the first conveying amount, between each of the N times of movements, to perform printing on an area having a width corresponding to the second conveying amount; and
   a generation part for, when the first printing mode is set, generating binary data corresponding to the area having the width corresponding to the first conveying amount by using a first binarization pattern having a number of pixels in a conveying direction of the printing medium, the number of pixels corresponding to a divisor of a number of pixels that corresponds to the first conveying amount, and when the second printing mode is set, generating binary data corresponding to the area having the width corresponding to the second conveying amount by using a second binarization pattern that differs from the first binarization pattern and has a number of pixels in the conveying direction, the number of pixels corresponding to a divisor of a number of pixels that corresponding to the second conveying amount.

3. The data generating apparatus as claimed in claim 1, wherein the binarization pattern is a pattern of a density pattern selection matrix used for selecting a density pattern.

4. The data generating apparatus as claimed in claim 1, wherein the binarization pattern is a dither pattern.

5. The data generating apparatus as claimed in claim 1, wherein the number of pixels corresponding to a divisor of the number of pixels that corresponds to the conveying amount is the same as the number of pixels that corresponds to the conveying amount of the printing medium.

6. The data generating apparatus as claimed in claim 1, further comprising a memory storing a mask used for dividing the binary data generated by said generation part into a plurality of binary data corresponding to the plurality of movements, wherein said mask is generated based on the binarization pattern.

7. The data generating apparatus as claimed in claim 1, wherein the data generating apparatus is a printing apparatus that performs printing on the printing medium with use of the printing head, or a host computer for supplying the binary data to the printing apparatus.

8. A printing apparatus for performing printing on a printing medium by using a print head in which a plurality of nozzles are arranged, said apparatus comprising:

a setting part for setting one printing mode of a plurality of printing modes including a first printing mode, in which M (M is an integer 2 or greater) times of movements of the printing head are performed and the printing medium is conveyed by a first conveying amount smaller than an arranging width of the plurality of nozzles of the printing head between each of the M times of movements, to perform printing on an area having a width corresponding to the first conveying amount, and a second printing mode, in which N (N is an integer greater than M) times of movements of the printing head are performed and the printing medium is conveyed by a second conveying amount, which is smaller than the first conveying amount, between each of the N times of movements, to perform printing on an area having a width corresponding to the second conveying amount; and a generation part for, when the first printing mode is set, generating binary data corresponding to the area having the width corresponding to the first conveying amount by using a first binarization pattern having a number of pixels in a conveying direction of the printing medium, the number of pixels corresponding to a divisor of a number of pixels that corresponds to the first conveying amount, and when the second printing mode is set, generating binary data corresponding to the area having the width corresponding to the second conveying amount by using a second binarization pattern that differs from the first binarization pattern and has a number of pixels in the conveying direction, the number of pixels corresponding to a divisor of a number of pixels that corresponds to the second conveying amount.

9. A data generating method of generating binary data used for performing printing on a printing medium by using a print head in which a plurality of nozzles are arranged, said method comprising:

a setting step of setting a printing mode, in which a plurality of movements of the printing head are performed and the printing medium is conveyed by a conveying amount smaller than an arranging width of the plurality of nozzles of the printing head between each of the plurality of movements, to perform printing on an area corresponding to the conveying amount;

a selection step of selecting a binarization pattern having a number of pixels corresponding to a divisor of a number of pixels that corresponds to the conveying amount in the printing mode set by said setting step, from a plurality of binarization patterns that differ in a number of pixels in a conveying direction of the printing medium from each other; and a generation step of generating binary data corresponding to the area by using a binarization pattern selected by said selection step.

10. A computer-readable storage medium storing a program that is read by a computer and causes the computer to execute the data generation method as claimed in claim 9.

* * * * *